US012591328B2

(12) United States Patent
Kwak et al.

(10) Patent No.: US 12,591,328 B2
(45) Date of Patent: Mar. 31, 2026

(54) ELECTRONIC DEVICE INCLUDING DISPLAY INCLUDING TOUCH CIRCUIT THAT PROCESSES CONTACT OF EXTERNAL OBJECT

(71) Applicant: Samsung Electronics Co., Ltd.,
Suwon-si (KR)

(72) Inventors: Sanghun Kwak, Suwon-si (KR);
Bongjun Ko, Suwon-si (KR);
Dongchul Kim, Suwon-si (KR);
Jihwan Kim, Suwon-si (KR); Daehyun Yoo, Suwon-si (KR); Hoondo Heo,
Suwon-si (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 0 days.

(21) Appl. No.: 19/002,072

(22) Filed: Dec. 26, 2024

(65) Prior Publication Data

US 2025/0147612 A1       May 8, 2025

Related U.S. Application Data

(63) Continuation of application No. PCT/KR2023/006773, filed on May 18, 2023.

(30) Foreign Application Priority Data

Jul. 15, 2022    (KR) ........................ 10-2022-0087572
Aug. 9, 2022    (KR) ........................ 10-2022-0099277

(51) Int. Cl.
*G06F 3/041* (2006.01)
*G06F 3/0354* (2013.01)
*G06F 3/038* (2013.01)

(52) U.S. Cl.
CPC ........ *G06F 3/0412* (2013.01); *G06F 3/03545* (2013.01); *G06F 3/038* (2013.01); *G06F 3/04146* (2019.05)

(58) Field of Classification Search
CPC .............. G06F 3/0412; G06F 3/04146; G06F 3/03545; G06F 3/038
See application file for complete search history.

(56) References Cited

U.S. PATENT DOCUMENTS 10,198,118 B2    2/2019   Park
10,750,007 B2    8/2020   Li
(Continued)

FOREIGN PATENT DOCUMENTS

CN    106682537 A    5/2017
CN    108900710 A    11/2018
(Continued)

OTHER PUBLICATIONS

International Search Report for PCT/KR2023/006773 mailed Sep. 7, 2023, 7 pages.
(Continued)

*Primary Examiner* — Peter D Mcloone
(74) *Attorney, Agent, or Firm* — Nixon & Vanderhye P.C.

(57) ABSTRACT

An electronic device is provided. The electronic device may include: a display panel including an area configured to receive a touch input. The electronic device may comprise a control circuit and a touch circuit including a touch sensor including multiple nodes in the area. The electronic device may comprise at least one processor, comprising processing circuitry. The control circuit may be configured to obtain multiple values through the multiple nodes at least partially based on an external object at least partially contacting the area. The control circuit may be configured to obtain, based on the multiple values, second data indicating at least some (Continued)

of the multiple nodes through which values within a reference range have been obtained in response to the contact of the external object.

20 Claims, 16 Drawing Sheets

(56) References Cited

U.S. PATENT DOCUMENTS

| | | | |
|---|---|---|---|
| 11,353,992 B2 | 6/2022 | Kwak et al. | |
| 2015/0248178 A1 | 9/2015 | Oh et al. | |
| 2017/0153763 A1* | 6/2017 | Vavra | G06F 3/0442 |
| 2021/0303127 A1 | 9/2021 | Kwak et al. | |
| 2022/0171519 A1 | 6/2022 | Garg et al. | |
| 2022/0187942 A1* | 6/2022 | Kwak | G06F 3/04166 |

FOREIGN PATENT DOCUMENTS

| | | | |
|---|---|---|---|
| CN | 109240541 A | 1/2019 | |
| CN | 109561203 A | 4/2019 | |
| CN | 111506209 A | 8/2020 | |
| CN | 111901854 A | 11/2020 | |
| EP | 3 929 707 A1 | 12/2021 | |
| KR | 10-2012-0138056 A | 12/2012 | |
| KR | 20120138056 A | 12/2012 | |
| KR | 20150103455 A | 9/2015 | |
| KR | 101823476 B1 | 1/2018 | |
| KR | 20200017736 A | 2/2020 | |
| KR | 10-2020-0101265 A | 8/2020 | |
| KR | 20200101265 A | 8/2020 | |
| KR | 102194788 B1 | 12/2020 | |
| KR | 20210037542 A | 4/2021 | |
| KR | 102569170 B1 | 8/2023 | |
| WO | 2020245989 A1 | 12/2020 | |

OTHER PUBLICATIONS

Written Opinion of the ISA for PCT/KR2023/006773 mailed Sep. 7, 2023, 6 pages.
Extended European Search Report dated Aug. 6, 2025 for EP Application No. 23839780.6.

* cited by examiner

600

610

CONTROL CIRCUITRY (333)

MISTOUCH DETERMINATION
PORTION (1201)

MISTOUCH PROCESSING
PORTION (1203)

FIG. 12

ELECTRONIC DEVICE INCLUDING DISPLAY INCLUDING TOUCH CIRCUIT THAT PROCESSES CONTACT OF EXTERNAL OBJECT

CROSS-REFERENCE TO RELATED APPLICATIONS

This application is a continuation of International Application No. PCT/KR2023/006773, designating the United States, filed on May 18, 2023, in the Korean Intellectual Property Receiving Office and claiming priority to Korean Patent Application Nos. 10-2022-0087572, filed on Jul. 15, 2022, and 10-2022-0099277, filed on Aug. 9, 2022, in the Korean Intellectual Property Office, the disclosures of each of which are incorporated by reference herein in their entireties.

BACKGROUND

Field

The disclosure relates to an electronic device including a display including touch circuitry processing contact of an external object.

Description of Related Art

An electronic device may include touch circuitry in a display to execute a function in response to a finger or a stylus pen in contact with the display. For example, the touch circuitry may include a touch sensor for identifying the contact based on a capacitive method, a resistive method, an infra-red method, an acoustic method, and/or a pressure method, and control circuitry for processing data obtained from the touch sensor.

SUMMARY

An electronic device is provided. The electronic device may comprise a display panel including an area capable of receiving a touch input. The electronic device may comprise touch circuitry including control circuitry, and a touch sensor, the touch sensor including a plurality of nodes in the area. The electronic device may comprise a processor comprising processing circuitry. The control circuitry may be configured to, based at least in part on an external object at least partially contacted on the area, respectively obtain a plurality of values via each of the plurality of nodes. The control circuitry may be configured to, based on the plurality of values, obtain first data indicating a partial area in the area that includes a representative location of the contact of the external object. The control circuitry may be configured to, based on the plurality of the values, obtain second data indicating at least a portion of the plurality of the nodes obtaining values within a reference range according to the contact of the external object. The control circuitry may be configured to, based at least in part on the second data, provide, to the processor, the first data, for recognizing the contact of the external object as a touch input on the area, or refrain from providing, to the processor, the first data.

An electronic device is provided. The electronic device may comprise a display panel including an area capable of receiving a touch input. The electronic device may comprise touch circuitry including control circuitry, and a touch sensor, the touch sensor including a plurality of nodes in the area. The electronic device may comprise a processor comprising processing circuitry. The control circuitry may be configured to, based at least in part on an external object at least partially contacted on the area, respectively obtain a plurality of values via each of the plurality of nodes. The control circuitry may be configured to, based on the plurality of values, obtain first data indicating a partial area in the area that includes a representative location of the contact of the external object. The control circuitry may be configured to, based on the plurality of the values, obtain second data indicating at least a portion of the plurality of the nodes obtaining values within a reference range according to the contact of the external object. The control circuitry may be configured to provide, to the processor, the first data and the second data. The processor may be configured to, based at least in part on the second data, identify whether recognizing the first data as a touch input on the area.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 12 is a block diagram illustrating an example configuration in control circuitry according to various embodiments;

DETAILED DESCRIPTION

Figure 1:
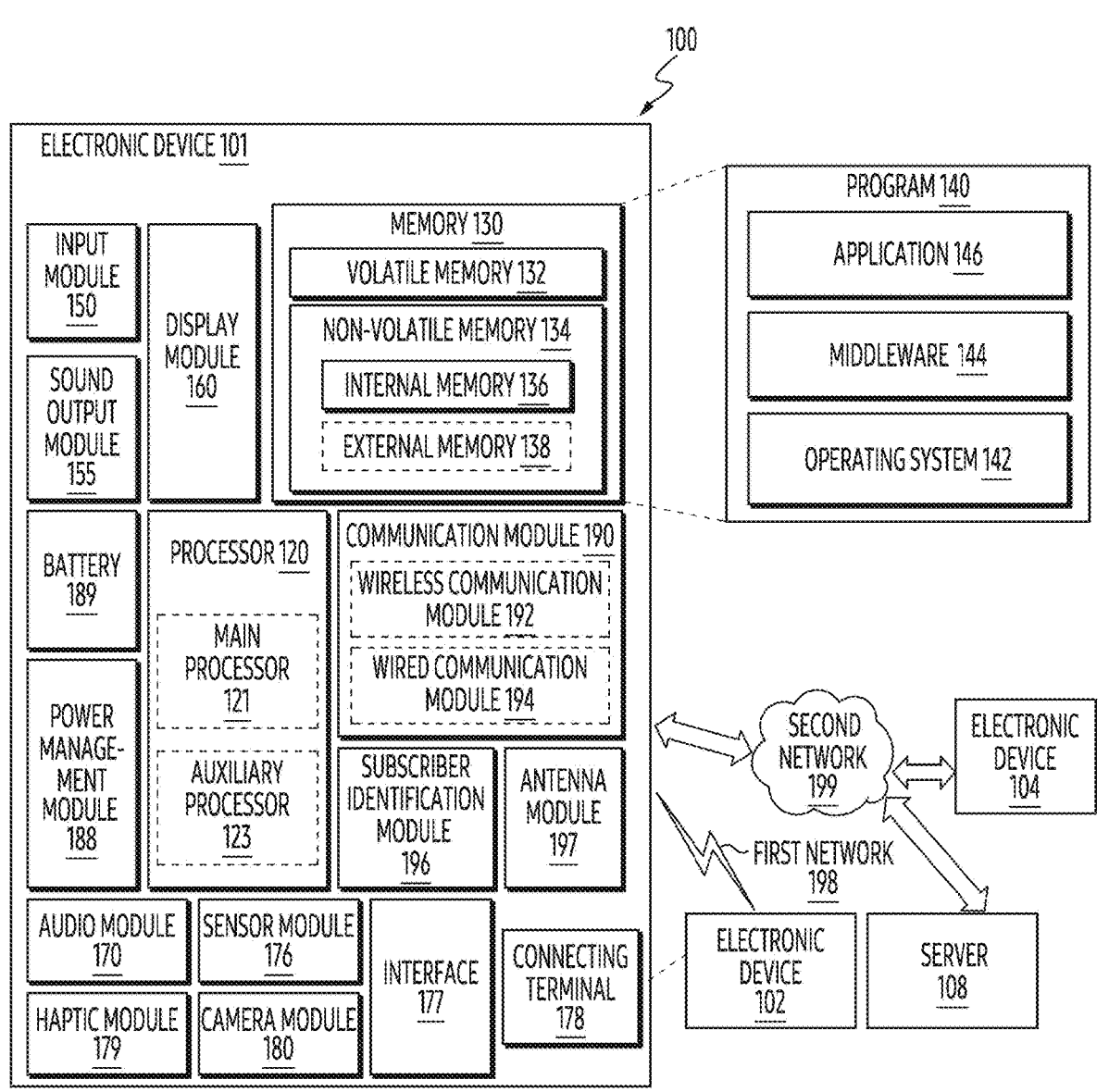
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
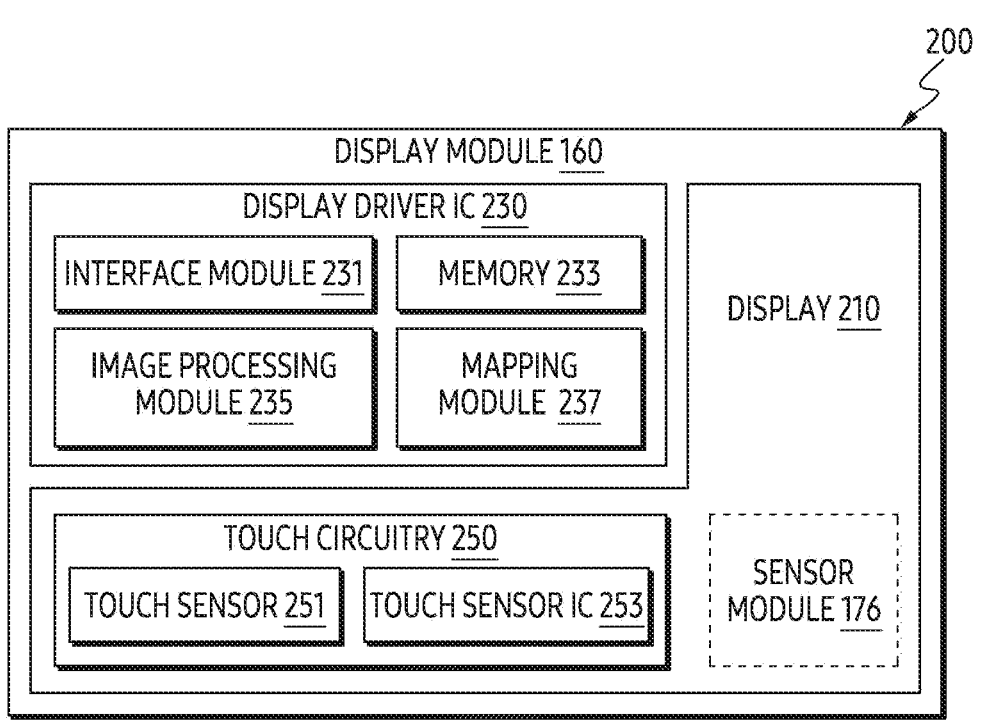
FIG. 2 is a block diagram illustrating an example configuration of a display module according to various embodiments.

FIG. 2 is a block diagram 200 illustrating an example configuration of the display module 160 according to various embodiments. Referring to FIG. 2, the display module 160 may include a display 210 and a display driver integrated circuit (DDI) 230 to control the display 210. The DDI 230 may include an interface module (e.g., including interface circuitry) 231, memory 233 (e.g., buffer memory), an image processing module (e.g., including image processing circuitry and/or executable program instructions) 235, and/or a mapping module (e.g., including various circuitry and/or executable program instructions) 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may further include touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display module 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

A portable electronic device (e.g., the electronic device 101) may be positioned in various environments. For example, the electronic device may be positioned in a pocket of a pants or jumper, or may be positioned in a bag. Although the electronic device positioned in the pocket or the bag is in a state incapable of receiving a user input, a touch input on a display of the electronic device may occur due to an unintended impact. The feedback on the touch input may be an operation of the electronic device that is unintended by the user.

Figure 3:
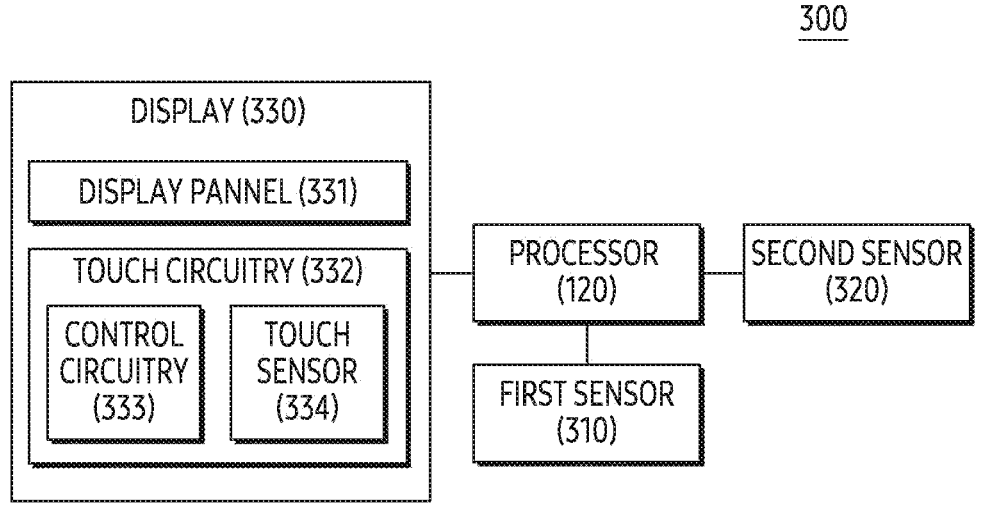
FIG. 3 is a block diagram illustrating an example configuration of an example electronic device according to various embodiments.

FIG. 3 is a block diagram illustrating an example configuration of an example electronic device according to various embodiments.

Referring to FIG. 3, an electronic device 300 (e.g., the electronic device 101) may include a processor (e.g., including various processing circuitry) 120, a first sensor 310, a second sensor 320, and/or a display 330.

For example, the processor 120 may include a main processor 121 and/or an auxiliary processor 123 (e.g., the sensor hub processor), which are illustrated in FIG. 1 and the description provided above is equally applicable here. For example, the processor 120 may be operably coupled to each of the first sensor 310 and the second sensor 320. For example, the processor 120 may be operably coupled to the display 330.

For example, the first sensor 310 may include the sensor module 176 illustrated in FIG. 1. For example, the first sensor 310 may be used to identify a change in a position of the electronic device 300. For example, the first sensor 310 may be used to identify a movement state (or a movement distance) of the electronic device 300 or a change in the movement state. For example, the first sensor 310 may be used to identify a posture of the electronic device 300 or a change in the posture of the electronic device 300. For example, the first sensor 310 may include an acceleration sensor and/or a gyro sensor. For example, the first sensor 310 may be referred to as an inertial sensor.

For example, the second sensor 320 may include the sensor module 176 illustrated in FIG. 1. For example, the second sensor 320 may be used to identify a state around the electronic device 300. For example, the second sensor 320 may be used to identify a grip state of the electronic device

300. For example, the second sensor 320 may include an illuminance sensor and/or a proximity sensor.

For example, the display 330 may include the display module 160 illustrated in FIG. 1 or FIG. 2. For example, the display 330 may include the display 210 illustrated in FIG. 2. For example, the display 330 may include a display panel 331 and touch circuitry 332.

For example, the display panel 331 may be used to display a screen or an image. For example, the display panel 331 may provide an area capable of receiving a touch input. For example, the area may correspond to a display area. However, the disclosure is not limited thereto.

For example, the touch circuitry 332 may include control circuitry 333 and a touch sensor 334. For example, the control circuitry 333 may be used to control the touch sensor 334. For example, the control circuitry 333 may process data for a plurality of values obtained from the touch sensor 334. For example, the control circuitry 333 may generate or obtain, based on the processing, data to be provided to the processor 120. For example, the control circuitry 333 may provide at least a portion of the data to the processor 120.

For example, the touch sensor 334 may obtain or identify the plurality of values via a plurality of nodes, in response to an external object at least partially contacted on the area. For example, the plurality of nodes of the touch sensor 334 will be illustrated through FIGS. 6, 7, and 9. For example, the external object may include an object and/or a body part, which is contacted on the area. For example, the external object may be a user's finger contacted on the area. For example, the external object may be a stylus pen, associated with the electronic device 300, contacted on the area. For example, when the electronic device 300 is positioned in a pocket, the external object may be an inner surface of the pocket that is contacted on the area. For example, when the electronic device 300 is positioned in a bag, the external object may be an inner surface of the bag that is contacted on the area. However, the disclosure is not limited thereto.

In the disclosure, the external object being contacted on the area may refer not only to the external object being directly contacted on the area, but also to the external object being positioned within a certain distance (or a predetermined distance) from the area. For example, the external object being contacted on the area may indicate that the external object is positioned above the area. However, the disclosure is not limited thereto.

For example, when the electronic device 300 is a bar type electronic device, the display 330 may include a single display. For example, the display 330, which is the single display, may include a planar portion. For example, the display 330, which is the single display, may include one or more curved portions extending from the planar portion. However, the disclosure is not limited thereto.

For example, when the electronic device 300 is a foldable-type electronic device, the display 330 may include a plurality of displays. For example, at least one of the plurality of displays may be a flexible display or a deformable display. For example, the at least one of the plurality of displays may be slid according to the movement of a housing of the electronic device 300. For example, according to the sliding, the at least one of the plurality of displays may be at least partially rolled into another housing of the electronic device 300. However, the disclosure is not limited thereto.

For example, the plurality of displays may include a first display and a second display. For example, the first display, which is the flexible display, may have a plurality of states, as illustrated and described in greater detail below with reference to FIGS. 4 to 5. For example, the second display may be a display exposed through a second surface, different from a first surface of the housing of the electronic device 300 to which the first display is exposed. The second display exposed through the second surface will be illustrated and described with reference to FIG. 5. According to embodiments, the second display may not be included in the electronic device 300.

For example, the electronic device 300, which is the foldable-type electronic device, may provide various states through the first display. For example, the various states may be illustrated in greater detail below with reference to FIGS. 4 and 5.

Figure 4:
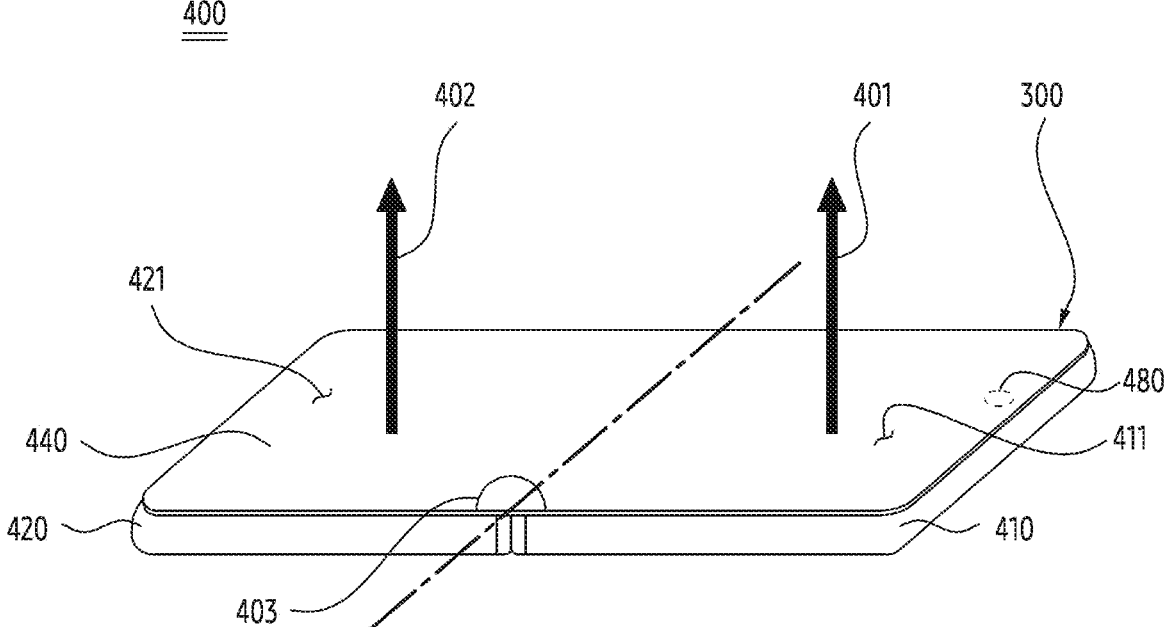
FIG. 4 is a perspective view illustrating an unfolded state of an example electronic device, according to various embodiments.

FIG. 4 is a perspective view illustrating an unfolded state of an example electronic device, according to various embodiments.

Figure 5:
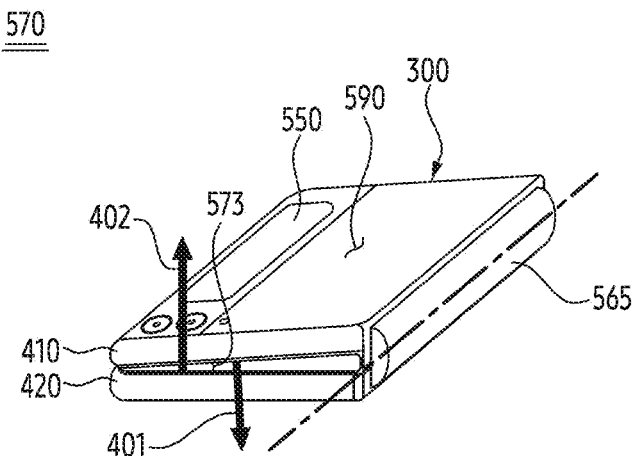
FIG. 5 is a perspective view illustrating a folded state of an example electronic device, according to various embodiments.

FIG. 5 is a perspective view illustrating a folded state of an example electronic device, according to various embodiments.

For example, referring to FIG. 4, an electronic device 300 may be in a state 400, which is the unfolded state in which a first housing 410 and a second housing 420 are fully unfolded out by a folding housing (a folding housing 565 illustrated in FIG. 5). According to an embodiment, the state 400 may refer, for example, to a state in which a first direction 401 toward which a first surface 411 of a first housing 410 faces corresponds to a second direction 402 toward which a second surface 421 of a second housing 420 faces. For example, in the state 400, the first direction 401 may be parallel to the second direction 402. For example, in the state 400, the first direction 401 may be the same as the second direction 402. According to an embodiment, in the state 400, the first surface 411 may form substantially one flat surface with the second surface 421. According to an embodiment, in the state 400, an angle 403 between the first surface 411 and the second surface 421 may be 180 degrees. According to an embodiment, the state 400 may refer, for example, to a state capable of providing an entire display area of the display 440, which is the first display indicated through the description of FIG. 3, on substantially one flat surface. For example, in the state 400, a display area of the display 440 may not include a curved surface. The unfolded state may be referred to as an outspread state or an outspreading state. According to an embodiment, a display area of the display 440 may include a second sensor 320. For example, the second sensor 320 may be disposed under an area 480 within the display 440 corresponding to the first surface 411 of the first housing 410. However, the disclosure is not limited thereto.

For example, referring to FIG. 5, the electronic device 300 may provide a state, which is the folded state in which the first housing 410 and the second housing 420 are folded in by the folding housing 565. According to an embodiment, the folded state including a state 570 may refer, for example, to a state in which the first direction 401 toward which the first surface 411 (not illustrated in FIG. 5) faces is distinguished from the second direction 402 toward which the second surface 421 (not illustrated in FIG. 5) faces. For example, in the state 570, an angle between the first direction 401 and the second direction 402 is substantially 180 degrees, and the first direction 401 and the second direction 402 may be distinguished from each other. For example, in the state 570, an angle 573 between the first surface 411 and the second surface 421 may be substantially 0 degrees. The folded state may be referred to as a folding state. For example, the electronic device 200 may provide the state 570 in which a display area (not illustrated in FIG. 5) of the display 440 corresponding to the first surface 411 substantially fully overlaps a display area (not illustrated in FIG. 5) of the display 440 corresponding to the second surface 421 as the first surface 411 and the second surface 421 face each other by the folding housing 565. For example, the electronic device 200 may provide the state 570 in which the first direction 401 is substantially opposite to the second direction 402. For another example, the state 570 may refer to a state in which a display area of the display 440 is obscured within the user's field of view looking at the electronic device 300. However, the disclosure is not limited thereto.

According to an embodiment, the display 440 may be bent by rotation provided through the folding housing 565. For example, in the state 570, a portion of the display area of the display 440 may be bent. For example, the portion of the display area of the display 440 may be in a curvedly bent state to prevent and/or reduce damage to the display 440 within the state 570. However, the disclosure is not limited thereto.

For example, the processor 120 may identify an angle between the first direction 401 toward which the first surface 411 of the first housing 410 faces and the second direction 402 toward which the second surface 421 of the second housing 420 faces, through a hall sensor in the electronic device 300, the first sensor 310 in the electronic device 300, a rotation sensor in the folding housing 565, a stretch sensor in the electronic device 300, and/or the second sensor 320 in the electronic device 300.

The first housing 410 may include a display 550, which is the second display indicated through the description of FIG. 3, on a second surface 590 opposite to the first surface 411. For example, in the folded state in which the display area of the display 440 is not visible, the display 550 may be used to provide visual information.

Referring back to FIG. 3, the control circuitry 333 of the display 330 may obtain each of a plurality of values via each of the plurality of nodes of the touch sensor 334, based at least in part on the external object at least partially contacted on the area.

For example, the plurality of nodes may be evenly included within the area. For example, the plurality of nodes may be spaced apart from each other by a certain interval. For example, the plurality of nodes may be included within the area in one or more patterns.

For example, at least a portion of the plurality of values may indicate a state of the area that is at least partially changed according to the contact of the external object. For example, at least a portion of the plurality of values may indicate a strength of the contact of the external object. For example, the plurality of nodes and the plurality of values will be illustrated with reference to FIG. 6.

Figure 6:
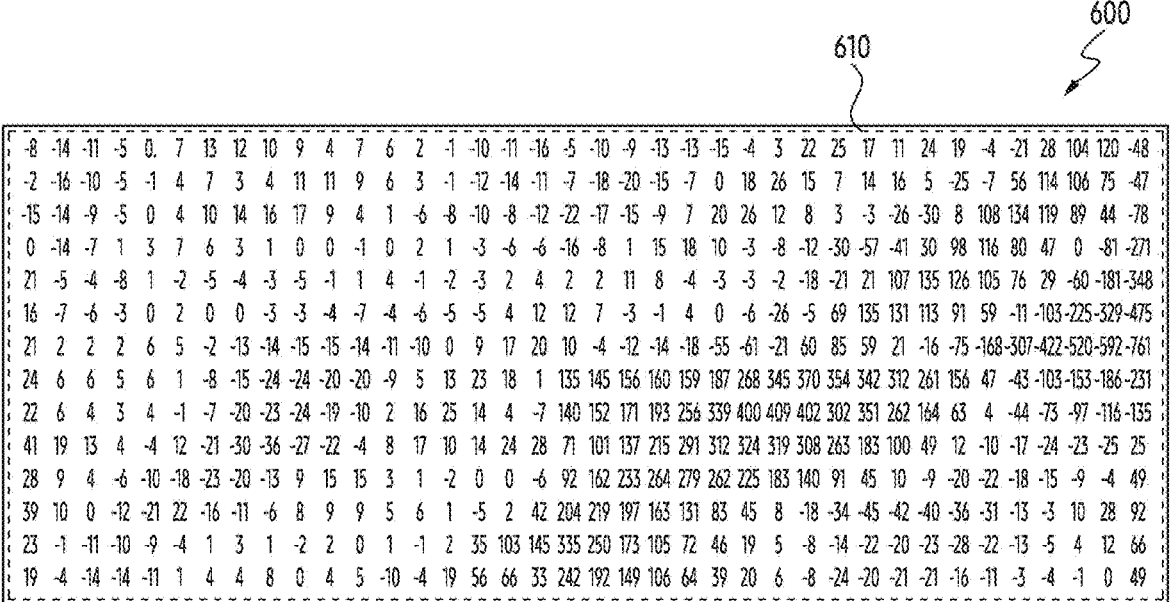
FIG. 6 is a diagram illustrating an example of a plurality of nodes of a touch sensor that obtain a plurality of values, based at least in part on an external object at least partially contacted on an area of a display panel according to various embodiments.

FIG. 6 is a diagram illustrating an example of a plurality of nodes of a touch sensor that obtain a plurality of values based at least in part on an external object at least partially contacted on an area of a display panel according to various embodiments.

Referring to FIG. 6, the control circuitry 333 may respectively obtain a plurality of values 610, through each of the plurality of nodes within an area 600 of a display panel 331 capable of receiving a touch input. For example, each of the plurality of nodes may be arranged in a location indicating a plurality of values 610 within the area 600. For example, as indicated by the plurality of values 610, the plurality of nodes may be evenly included within the area 600. However, the disclosure is not limited thereto. For example, positive values among the plurality of values 610 may indicate a strength of the contact of the external object. For example, negative values among the plurality of values 610 may indicate that retransmission is caused within at least a portion of the plurality of nodes according to the contact of the external object. For example, the negative values may indicate that noise is caused within the area 600 of the display panel 331 according to the contact of the external object. For example, the negative values may be obtained through at least a portion of the plurality of nodes, when the strength of the contact of the external object is relatively small and an area in which the external object is contacted on the area 600 is relatively large. However, the disclosure is not limited thereto.

Referring back to FIG. 3, the control circuitry 333 may obtain first data based on the plurality of values. For example, the first data may indicate at least a portion of a partial area within the area that includes a representative location of the contact of the external object. For example, the representative location may indicate a location of a node obtaining a peak value to be illustrated below. For example, the first data may indicate at least a portion of the partial area in which the external object is contacted on the area. For example, when the contact of the external object is a touch input, the first data may be used to identify an attribute (e.g., a type and/or a location of input means) of the touch input.

For example, the control circuitry 333 may identify a node obtaining a peak value among the plurality of values, using a window having a predetermined size, among the plurality of nodes. For example, the window may be used to identify values obtained through nodes around a target node of the window, among the plurality of nodes. For example, the predetermined size may be 3×3 to identify values obtained through eight nodes around the target node. However, the disclosure is not limited thereto. For example, the peak value may be a maximum value from among values of nodes within the window. For example, the peak value may be a maximum value from among values within the partial area. For example, the peak value may be identified when the maximum value is greater than or equal to a predetermined value.

For example, the control circuitry 333 may identify first nodes around the node that obtain values greater than or equal to a first reference value, among the plurality of nodes. For example, the first reference value may be set to a value smaller than the predetermined value. For example, when the predetermined value is 200, the first reference value may be 100. However, the disclosure is not limited thereto. For example, the first nodes may be identified based on the node obtaining the peak value. For example, the first data may be obtained based on the node and the first nodes. For example, the first data may indicate the number of the node and the first nodes. For example, the first data may indicate a width (or horizontal length) of the partial area and/or a height (vertical length) of the partial area, based on the node and the first nodes. For example, the first data may indicate a sum of values obtained through the node and the first nodes. For example, the first data may indicate a center point of the partial area. For example, the first data may indicate a location of the node. However, the disclosure is not limited thereto. For example, obtaining the first data may be illustrated and described in greater detail below with reference to FIG. 7.

Figure 7:
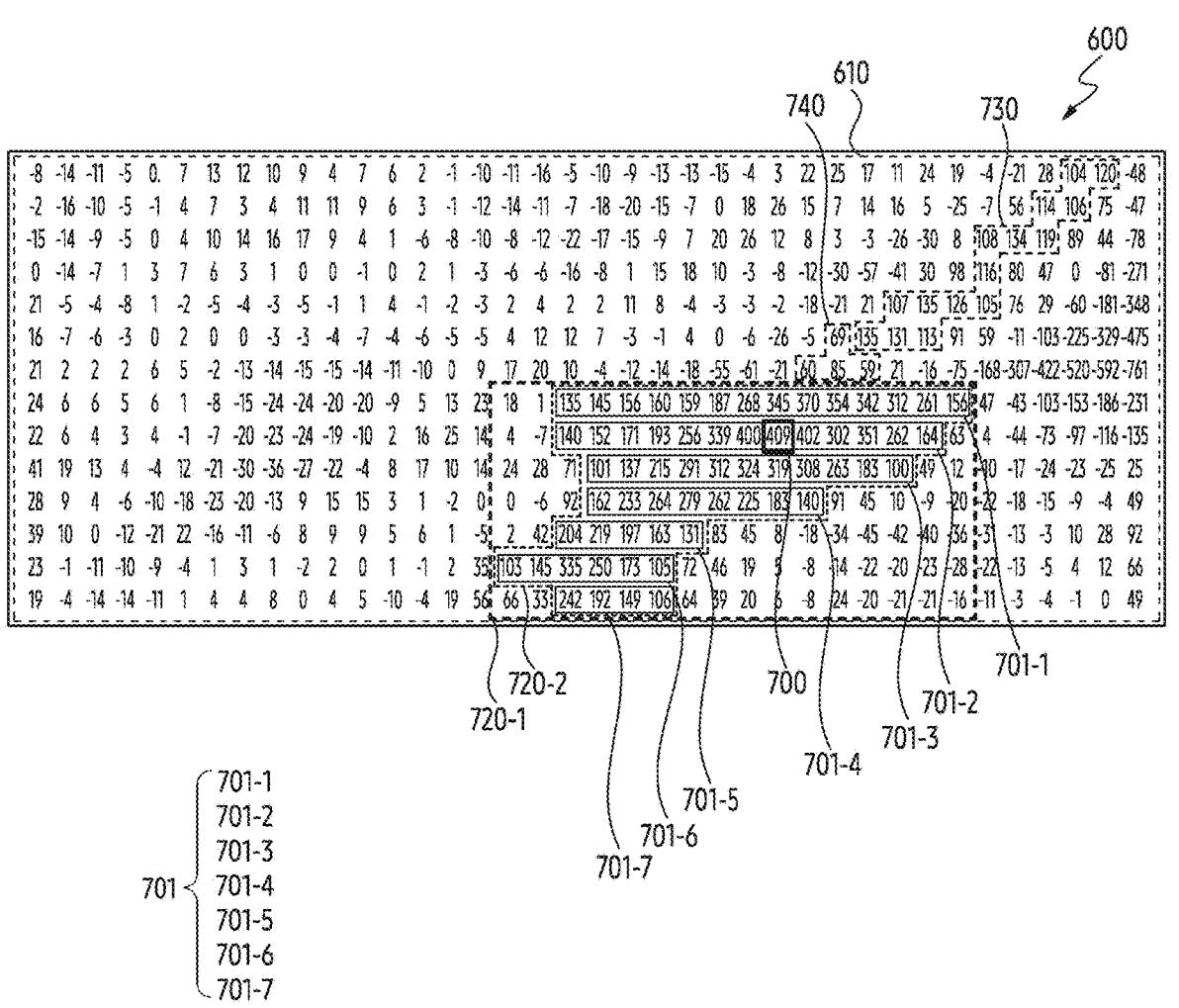
FIG. 7 is a diagram illustrating an example of obtaining first data based at least in part on an external object at least partially contacted on an area of a display panel according to various embodiments.

FIG. 7 is a diagram illustrating an example of obtaining first data based at least in part on an external object at least partially contacted on an area of a display panel according to various embodiments.

Referring to FIG. 7, control circuitry 333 may identify a peak value (e.g., 409) among a plurality of values 610, using the window, based at least in part on the contact of the external object. For example, the control circuitry 333 may identify a node 700 obtaining the peak value, in response to the contact of the external object. For example, the peak value may be a maximum value among values included in the window, which are greater than or equal to the predetermined value (e.g., 200). For example, the peak value may be a maximum value among values included in a partial area 720-1 or a partial area 720-2 to be illustrated below, which are greater than or equal to the predetermined value. However, the disclosure is not limited thereto.

For example, the control circuitry 333 may identify a first node 701 including nodes 701-1, nodes 701-2, nodes 701-3, nodes 701-4, nodes 701-5, nodes 701-6, and nodes 701-7, based on the node 700 obtaining the peak value. For example, the first nodes 701 may be nodes obtaining values greater than or equal to the first reference value (e.g., 100) among nodes around the node 700. However, the disclosure is not limited thereto.

For example, the control circuitry 333 may obtain the first data, by utilizing the node 700 and the first nodes 701 or utilizing the peak value obtained via the node 700 and the values obtained via the first nodes 701. However, the disclosure is not limited thereto.

Referring back to FIG. 3, the first data may be suitable for identifying an attribute of a touch input, but the first data may also be unsuitable for identifying whether the contact of the external object is an unintended touch input (or an incorrect touch input). For example, the first data may be unsuitable for identifying whether the contact of the external object is contact of an inner surface of a pocket including the electronic device 300. For example, since the unintended touch input may not clearly distinguish an edge of the partial area, the first data may be unsuitable for identifying whether the contact of the external object is the unintended touch input.

For example, referring to FIG. 7, although the values in the partial area 730 are greater than or equal to the first reference value, since the values in the partial area 740 are less than the first reference value, the partial area 730 may not be identified as a partial area 720-1 or a partial area 720-2 indicated by the first data.

Figure 8:
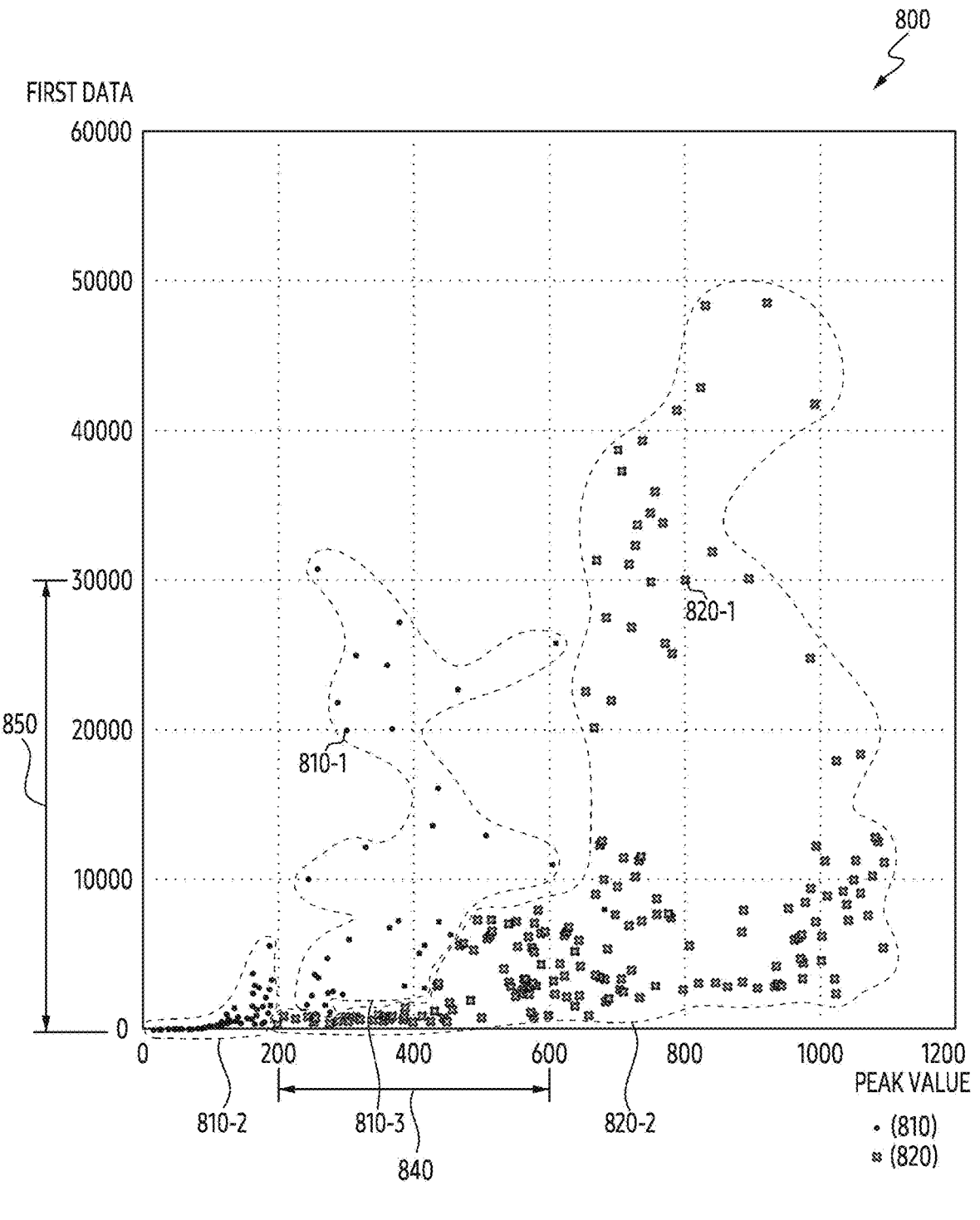
FIG. 8 is a graph illustrating contact of various types of an external object classified according to first data and a peak value according to various embodiments.

Referring back to FIG. 3, it may be illustrated through FIG. 8 that the first data is not recommended for identifying whether the contact of the external object is the unintended touch input.

FIG. 8 is a graph illustrating contact of various types of an external object classified according to first data and a peak value according to various embodiments.

Referring to FIG. 8, a horizontal axis of chart 800 may indicate a peak value, and a vertical axis of chart (or graph, the terms chart and graph may be used interchangeably herein) 800 may indicate the first data. For example, each of points 810 in the chart 800 may indicate an unintended touch input (e.g., a contact of an inner surface of a pocket including the electronic device 300), and each of points 820 in the chart 800 may indicate an intended touch input (e.g., a touch input caused by a 5 millimeter (mm) diameter conductive rod within a non-ground, a touch input from a thumb within ground, a touch input from a thumb within non-ground, a touch input from an index finger within ground, a touch input from an index finger within non-ground, a touch input from two fingers within ground (e.g., pinch zoom-in gesture on the area and/or pinch zoom-out gesture on the area), a touch input from two fingers within non-ground, and a palm swipe gesture on the area). For example, a point 810-1 in the chart 800 may indicate an unintended touch input in which the peak value is about 300 and the first data is about 20,000. For example, the point 820-1 in the chart 800 may indicate the intended touch input (e.g., the touch input from a thumb in ground) in which the peak value is about 800 and the first data is about 30,000. For example, since the points 810 in the chart 800 include a first group of points 810-2 indicating an unintended touch input having the peak value less than or equal to about 200 and the first data less than about 6,000, as well as a second group of points 810-3 indicating an unintended touch input having the peak value of about 200 to about 600 and the first data of about 5,000 to 30,000, identification of the unintended touch input through the peak value and the first data may ambiguous or unclear. For example, at least a portion of the points 810 and at least a portion of the points 820-2 of the first group may overlap within a range 840 of peak values of about 200 to about 600. For example, at least a portion of the points 810 and at least a portion of the points 820-2 of the first group may overlap within a range 850 of the first data of about 30,000 or less. For example, due to the overlap, identification (or classification) of the unintended touch input and the intended touch input through the peak value and the first data may be ambiguous or unclear. For example, since the classification of the unintended touch input through the first data may be unsuitable, the control circuitry 333 may obtain another data distinct from the first data.

Referring back to FIG. 3, the control circuitry 333 may obtain second data, which is the other data, based on the plurality of values. For example, the second data may be obtained to identify whether the contact of the external object is the unintended touch input. For example, the second data may be obtained to identify whether the contact of the external object is the contact of the inner surface of the pocket including the electronic device 300. For example, the second data may indicate at least a portion of the plurality of nodes obtaining values within a reference range according to the contact of the external object. According to an embodiment, the second data may be obtained by the processor 120. For example, when the second data is obtained by the processor 120, the control circuitry 333 may provide the processor 120 with data (e.g., raw data) for obtaining the second data. However, the disclosure is not limited thereto.

For example, the values within the reference range may include values equal to or greater than a second reference value among the plurality of values. For example, the second reference value may be smaller than the first reference value. For example, a strength of the contact of the unintended touch input on the area (e.g., the contact of the inner surface of the pocket on the area) may be lower than a strength of the contact of the intended touch input on the area, the second reference value may be smaller than the first reference value. For example, the extent of the contact of the unintended touch input on the area (e.g., the contact of the inner surface of the pocket on the area) may be larger than the contact extent of the intended touch input on the area, the second reference value may be smaller than the first reference value.

For example, the values within the reference range may include values equal to or less than a third reference value among the plurality of values. For example, each of the first reference value and the second reference value may be a positive number, while the third reference value may be a negative number. For example, the contact of the unintended touch input on the area (e.g., the contact of the inner surface of the pocket on the area) may cause retransmission within at least a portion of the plurality of nodes more frequently than the contact of the intended touch input on the area, the third reference value may be a negative number. For example, the contact of the unintended touch input on the area (e.g., the contact of the inner surface of the pocket on the area) may cause noise more frequently than the contact of the intended touch input on the area, the third reference value may be a negative number. For example, the extent of the contact of the unintended touch input on the area (e.g., the contact of the inner surface of the pocket on the area) may be larger than the extent of the contact of the intended touch input on the area, an absolute value of the third reference value may be smaller than an absolute value of the first reference value. However, the disclosure is not limited thereto.

For example, the values within the reference range may include values equal to or greater than the second reference value and values equal to or less than the third reference value, among the plurality of values.

For example, the second data may be different from the first data obtained based on the peak value. For example, the second data may be different from the first data for identifying the partial area. For example, the second data may be obtained to identify a state of the entire area according to the contact of the external object, unlike the first data obtained in relation to the partial area.

For example, the control circuitry 333 may identify the second nodes obtaining the values greater than or equal to the second reference value and the third nodes obtaining the values less than or equal to the third reference value as at least a portion of the plurality of nodes. For example, the control circuitry 333 may obtain the second data, based on the second nodes and the third nodes. For example, the second data may indicate the number of the second nodes and the third nodes. For example, the second data may indicate a ratio of the number of the second nodes and the third nodes to the number of the plurality of nodes. However, the disclosure is not limited thereto. For example, obtaining the second data may be illustrated and described in greater detail below with reference to FIG. 9.

Figure 9:
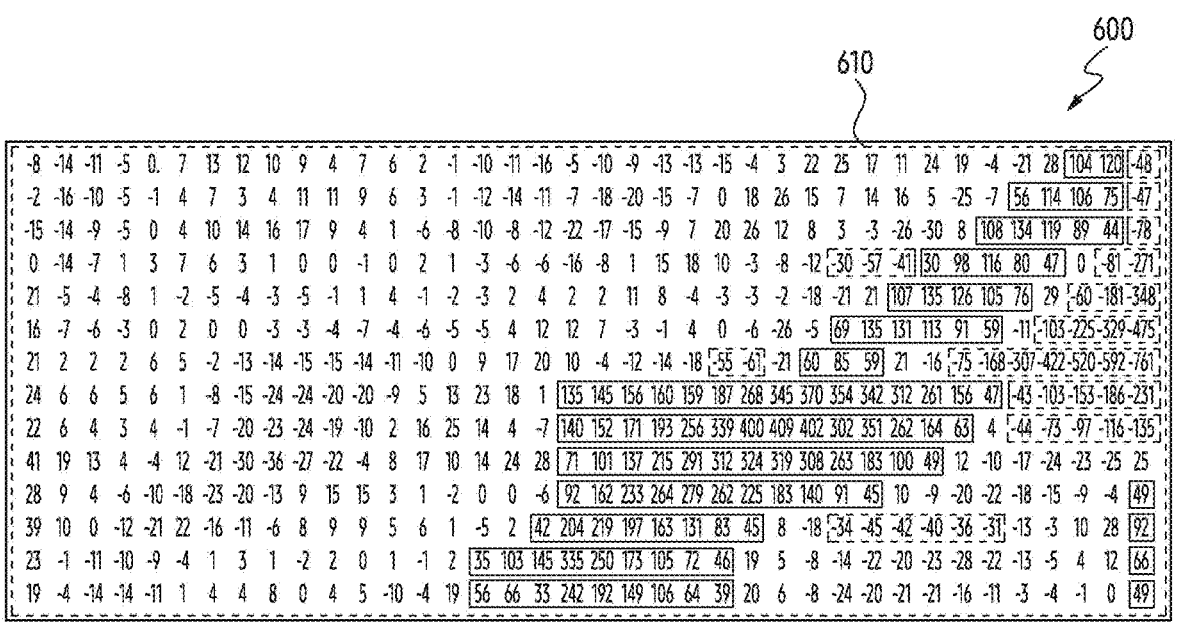
FIG. 9 is a diagram illustrating an example of obtaining second data based at least in part on an external object at least partially contacted on an area of a display panel according to various embodiments.

FIG. 9 is a diagram illustrating an example of obtaining second data based at least in part on an external object at least partially contacted on an area of a display panel according to various embodiments.

Referring to FIG. 9, control circuitry 333 may identify the values greater than or equal to the second reference value (e.g., 30) among a plurality of values 610, based at least in part on the contact of the external object. For example, the control circuitry 333 may identify second nodes 910 obtaining the values greater than or equal to the second reference value, in response to the contact of the external object. For example, the control circuitry 333 may identify the values less than or equal to the third reference value (e.g., −30) among the plurality of values 610, based at least in part on the contact of the external object. For example, the control circuitry 333 may identify third nodes 920 obtaining the values less than or equal to the third reference value, in response to the contact of the external object. For example, the control circuitry 333 may obtain the second data based on the second nodes 910 and the third nodes 920.

Referring back to FIG. 3, the second data may be more suitable than the first data to identify whether the contact of the external object is the unintended touch input (or incorrect touch input). For example, since the unintended touch input of the external object (e.g., the contact of the inner surface of the pocket on the area) may have an intensity lower than the intended touch input contacted on the area, and may have the extent larger than the intended touch input contacted on the area, the second data may be more suitable to identify whether the contact of the external object is the unintended touch input than the first data obtained for identifying the partial area.

For example, referring to FIGS. 7 and 9, the number of second nodes 910 illustrated in FIG. 9 may be greater than the number of first nodes 701 illustrated in FIG. 7. The number of second nodes 910 illustrated in FIG. 9 being greater than the number of first nodes 701 illustrated in FIG. 7 may indicate that the second data, unlike the first data, reflects a situation in which the strength of the contact of the external object on the area is relatively small. For example, the fact that the second data includes third nodes 920 obtaining negative values in FIG. 9 may indicate that the second data, unlike the first data, reflects retransmission and noise due to the contact of the external object on the area. For example, the fact that the extent occupied by the second nodes 910 and the third nodes 920 illustrated in FIG. 9 is larger than the extent occupied by the first nodes 701 illustrated in FIG. 7 indicates that the second data, unlike the first data, reflects a situation in which the extent where the external object is contacted on the area is relatively small.

Figure 10:
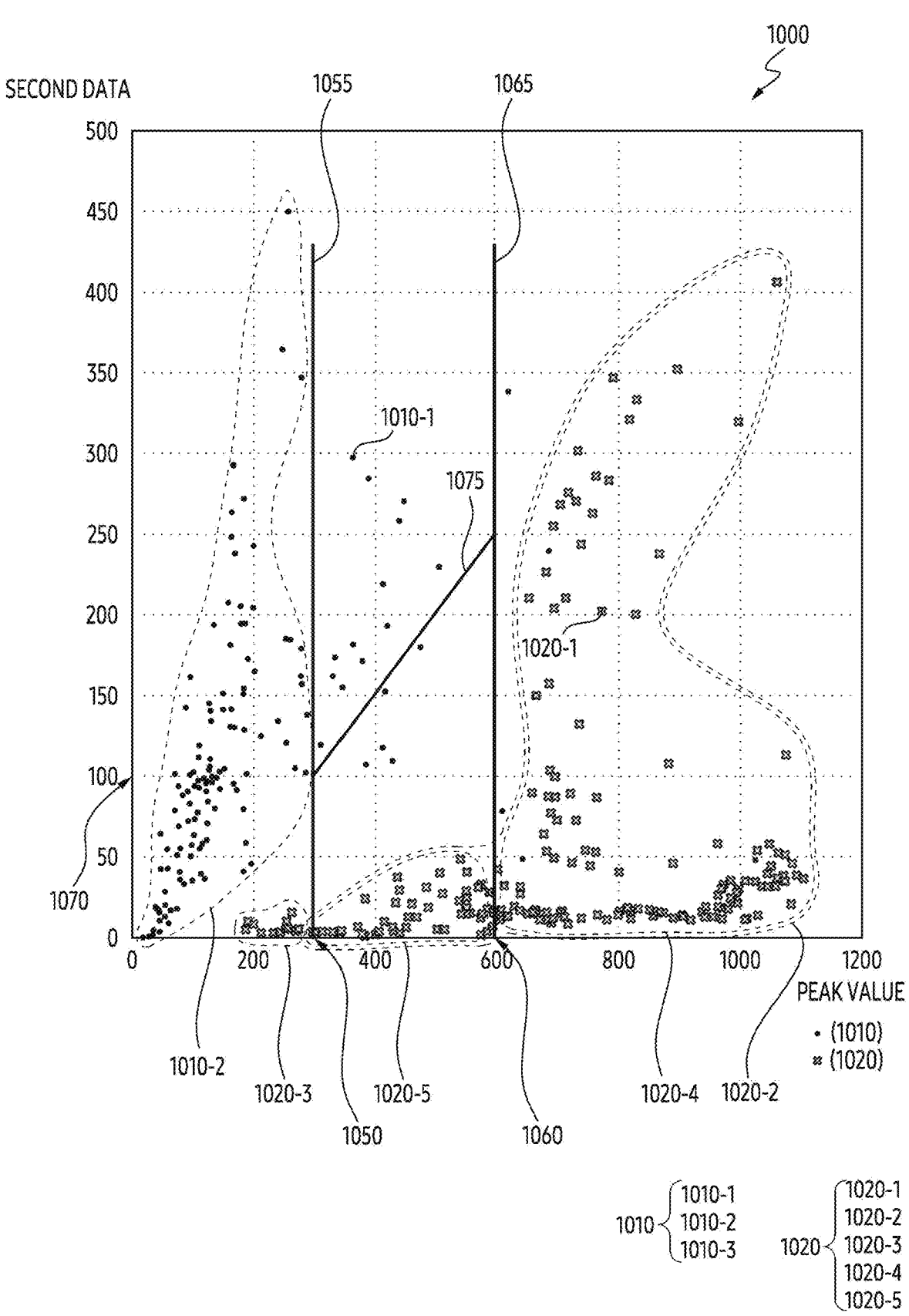
FIG. 10 is a graph illustrating various types of a touch input classified according to second data and a peak value according to various embodiments.

Referring back to FIG. 3, it may be illustrated through FIG. 10 that the second data is usable to identify whether the contact of the external object is the unintended touch input.

FIG. 10 is a graph illustrating various types of a touch input classified according to second data and a peak value according to various embodiments.

Referring to FIG. 10, a horizontal axis of chart 1000 may indicate a peak value, and a vertical axis of chart 1000 may indicate the second data (e.g., the number of the second nodes and the third nodes). For example, each of the points 1010 in the chart 1000 may indicate an unintended touch input (e.g., a contact with an inner surface of a pocket including the electronic device 300), and each of points 1020 in the chart 1000 may indicate an intended touch input (e.g., a touch input caused by a 5 millimeter (mm) diameter conductive rod within a non-ground, a touch input from a thumb within ground, a touch input from a thumb within non-ground, a touch input from an index finger within ground, a touch input from an index finger within non-ground, a touch input from two fingers within ground (e.g., pinch zoom-in gesture on the area and/or pinch zoom-out gesture on the area), a touch input from two fingers within non-ground, and a palm swipe gesture on the area). For example, a point 1010-1 in the chart 1000 may indicate the unintended touch input in which the peak value is about 350 and the second data is about 300. For example, a point 1020-1 in the chart 1000 may indicate the intended touch input (e.g., touch input from a thumb within ground) in which the peak value is about 780, and the second data is about 200.

For example, since most of the points 1010 in the chart 1000 are positioned to the left of a line 1055 from a peak value 1050 (e.g., a peak value of a touch input from a conductive rod of 7 mm in diameter) indicating that it is less than the peak value 1050 in a range of 200 to 400, and most of the points 1020 in the chart 1000 are positioned to the right of the line 1055 indicating that it is greater than or equal to the peak value 1050, the unintended touch input and the intended touch input may be classified or identified based on the line 1055. For example, points 1010-2 of the first group indicating the unintended touch input are positioned to the left of the line 1055, and points 1020-2 of the first group indicating the intended touch input are positioned to the right of the line 1055, the second data may be used to identify whether the contact of the external object is the unintended touch input, unlike the first data.

For example, when identifying through the line 1055 whether the contact of the external object is the unintended touch input, the intended touch input indicated by points 1020-3 of the second group positioned to the left of the line 1055 in the chart 1000 may be identified as the unintended touch input, and the unintended touch input indicated by points 1010-3 of the second group positioned to the right of the line 1055 in the chart 1000 may be identified as the intended touch input. In order to reduce this identification, the unintended touch input and the intended touch input may be classified or identified based on a line 1065 from a peak value 1060 (e.g., a peak value of a touch input from a conductive rod of 12 mm in diameter, 600). For example, since the points 1010-2 of the first group and the points 1010-3 of the second group indicating the unintended touch input are positioned to the left of the line 1065, and points 1020-4 of a third group indicating the intended touch input are positioned to the right of the line 1065, the second data may be used to identify whether the contact of the external object is the unintended touch input, unlike the first data.

For example, when identifying through the line 1065 whether the contact of the external object is the unintended touch input, the intended touch input indicated by points 1020-5 of a fourth group positioned to the left of line 1065 in the chart 1000 may be identified as the unintended touch input. In order to reduce this identification, the unintended touch input and the intended touch input may be classified or identified based on a peak value 1050 (another reference number to be illustrated below) and a reference number 1070. For example, the unintended touch input and the intended touch input may be classified based on a line 1075 from the peak value 1050 and the reference number 1070. For example, since the points 1010-2 of the first group and the points 1010-3 of the second group indicating the unintended touch input and the points 1020-2 of the first group indicating the intended touch input are classified based on the line 1075, the second data may be used to identify whether the contact of the external object is the unintended touch input, unlike the first data.

Referring back to FIG. 3, the control circuitry 333 may identify whether the contact of the external object is the intended touch input or the unintended touch input, based at least in part on the second data.

For example, the control circuitry 333 may provide the first data to the processor 120 in order to provide feedback (or response) in response to the contact of the external object, based on identifying that the contact of the external object is the intended touch input. For example, the processor 120 may provide the feedback (or the response) by executing a predetermined function based on the first data. For example, the predetermined function may include changing a display within the area or initiating a display within the area.

For example, the control circuitry 333 may refrain from, bypass, or omit providing the first data to the processor 120, based on identifying that the contact of the external object is the unintended touch input. For example, when the first data is provided to the processor 120, feedback on the contact of the external object may be provided, even though the contact of the external object is the unintended touch input, so the control circuitry 333 may refrain from, or bypass providing the first data to the processor 120.

For example, based at least in part on the second data, the control circuitry 333 may provide the first data to the processor 120 to recognize the contact of the external object as a touch input (e.g., the intended touch input) on the area, or may refrain from providing the first data to the processor 120.

For example, based at least in part on the second data indicating a number (e.g., the number of the second nodes and the third nodes) greater than or equal to a reference number, the control circuitry 333 may provide the processor 120 with the first data obtained based on a node obtaining a peak value greater than or equal to a first threshold value.

For example, the reference number may be used to estimate the electronic device 300 in the pocket. For example, the number indicated by the second data being greater than or equal to the reference number may indicate that a probability of the electronic device 300 being positioned inside the pocket is higher than a probability of the electronic device 300 being positioned outside the pocket. For example, the number indicated by the second data being greater than or equal to the reference number may indicate that a probability of the electronic device 300 being positioned outside the pocket is higher than a probability of the electronic device 300 being positioned inside the pocket.

For example, the first threshold value may be used to reduce providing of a response (or feedback) for the unintended touch input. For example, the first threshold value may be a peak value 1050 in FIG. 10. For example, the first threshold value may be a peak value 1060 in FIG. 10. However, the disclosure is not limited thereto.

For example, the control circuitry 333 may refrain from, block, or cease providing, to the processor 120, the first data obtained based on a node obtaining the peak value less than the first threshold value, based at least in part on the second data indicating the number greater than or equal to the reference number.

For example, the control circuitry 333 may provide the processor 120 with the first data obtained based on a node obtaining a peak value greater than or equal to a second threshold value, based at least in part on the second data indicating the number less than the reference number.

For example, the second threshold value may be used to reduce providing the unintended touch input based on the estimation that the electronic device 300 is positioned outside the pocket. For example, the second threshold value may be smaller than the first threshold value. For example, when the first threshold value is the peak value 1050 in FIG. 10, the second threshold value may be a value smaller than the peak value 1050. For example, when the first threshold value is the peak value 1060 in FIG. 10, the second threshold value may be the peak value 1050. However, the disclosure is not limited thereto.

For example, the control circuitry 333 may refrain from, block, or cease providing, to the processor 120, the first data obtained based on a node obtaining a peak value less than the second threshold value, based at least in part on the second data indicating the number less than the reference number.

According to an embodiment, the control circuitry 333 may identify whether providing the first data to the processor 120 by utilizing the first threshold value for the contact of the external object contacted on a portion of the area, based at least in part on the second data indicating the number less than the reference number. For example, the control circuitry 333 may provide the processor 120 with the first data, in order to recognize the contact of the external object contacted on another portion (or remaining portion) of the area, distinct from the portion of the area, as a touch input (e.g., the intended touch input). For example, instead of using the second threshold value, the control circuitry 333 may use the first threshold value to identify whether to provide the first data to the processor 120 according to whether the external object is contacted on the portion of the area.

For example, the portion of the area may be a reference partial area within the area. For example, the reference partial area may be a portion of the area that executes a predetermined function in response to a touch input. The reference partial area may be illustrated and described in greater detail below with reference to FIG. 11.

Figure 11:
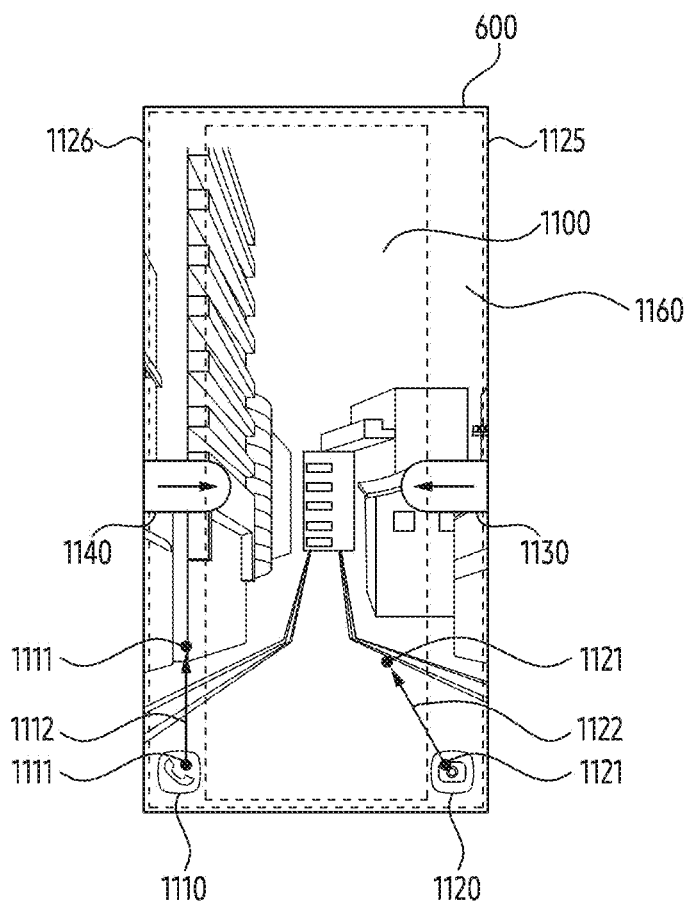
FIG. 11 is a diagram illustrating an example of a reference partial area within an area of a display panel, according to various embodiments.

FIG. 11 is a diagram illustrating an example of a reference partial area within an area of a display panel, according to various embodiments.

Referring to FIG. 11, a processor 120 may display a screen 1100 within an area 600. For example, the screen 1100 may include a lock screen. For example, the screen 1100 may include a screen that is displayed while an always on display (AOD) mode is provided. For example, the AOD mode may refer, for example, to a mode displaying an image (or screen) through a display 330 in a low power state. For example, within at least a portion of a time interval during which the AOD mode is provided within the electronic device 300, the processor 120 of the electronic device 300 may be in a low power state or a sleep state. However, the disclosure is not limited thereto.

For example, the screen 1100 may include an executable object capable of executing a predetermined function in response to a touch input. For example, the screen 1100 may include an executable object 1110 and/or an executable object 1120. For example, the executable object 1110 may be configured to execute a predetermined function (e.g., outgoing call) in response to a touch input in which a contact point 1111 within the executable object 1110 is moved in a predetermined direction 1112 and then released. For example, the executable object 1120 may be configured to execute a predetermined function (e.g., enabling a camera) in response to a touch input in which a contact point 1121 within the executable object 1120 is moved in a predetermined direction 1122 and then released. However, the disclosure is not limited thereto.

For example, the screen 1100 may be configured to execute a predetermined function in response to a touch input having a predetermined pattern. For example, the screen 1100 may be configured to execute a predetermined function in response to a swipe input 1130 from an edge 1125 of the area 600. For example, the screen 1100 may be configured to execute a predetermined function in response to a swipe input 1140 from an edge 1126 of the area 600. However, the disclosure is not limited thereto.

For example, the reference portion area may be provided within the area 600 for the screen 1100, in order to reduce providing a predetermined function in response to an unintended touch input to the executable object 1110, an unintended touch input to the executable object 1120, an unintended swipe input 1130, and/or an unintended swipe input 1140. For example, the area 600 may include a reference partial area 1160 for reducing execution of a predetermined function according to the unintended touch input to the executable object 1110, the unintended touch input to the executable object 1120, the unintended swipe input 1130, and/or the unintended swipe input 1140. For example, the control circuitry 333 may identify whether a representative location of the contact of the external object is associated with the reference partial area 1160. The control circuitry 333 may identify whether providing the first data to the processor 120 by utilizing the first threshold value, based on the representative location (e.g., the representative location inside the reference partial area 1160) associated with the reference partial area 1160. The control circuitry 333 may provide the first data to the processor 120, based on the representative location (e.g., the representative location outside the reference partial area 1160) not associated with the reference partial area 1160. However, the disclosure is not limited thereto.

Referring back to FIG. 3, the control circuitry 333 may provide the processor with the first data obtained based on the node obtaining the peak value greater than or equal to the first threshold value, based at least in part on the second data indicating the number (e.g., the number of the second nodes and the third nodes) that is greater than or equal to the reference number and less than another reference number (e.g., the peak value 1050 in FIG. 10). For example, the other reference number may be greater than the reference number. For example, referring to FIG. 10, since the peak value 1050 may be used to classify, based on the line 1075 in the chart 1000, the unintended touch input indicated by the points 1010-2 of the first group and the points 1010-3 of the second group, and the touch input indicated by the points 1020-2 of the first group, the peak value 1050 may be used as the other reference number.

Referring back to FIG. 3, the control circuitry 333 may refrain from providing, to the processor, the first data obtained based on the node obtaining the peak value less than the first threshold value, based at least in part on the second data indicating the number that is greater than or equal to the reference number and less than the other reference number.

For example, the control circuitry 333 may identify a third threshold value corresponding to the number, based at least in part on the second data indicating the number greater than or equal to the other reference number. For example, the third threshold value may be identified based on the number and the peak value. For example, the third threshold value may be identified through Equation 1 below.

$$minPeak = \begin{cases} b & (nodecountPN30 < a) \\ \dfrac{nodecountPN30 - d}{c} & (nodecountPN30 \geq a) \end{cases} \quad \text{[Equation 1]}$$

In Equation 1, "a" indicates the other reference number, "b" indicates the first threshold value, "c" indicates a slope of the line 1075 in FIG. 10, "d" indicates a variable for identifying the y-intercept of (nodecountPN30-d)/c, and "(nodecounPN30-d)/c" indicates the third threshold value. For example, referring to FIG. 10, "(nodecountPN30-d)/c" may indicate the line 1075, "a" may be the peak value 1050, "c" may be 2, and "d" may be 100.

Referring back to FIG. 3, the control circuitry 333 may identify whether to obtain the second data, according to whether a predetermined signal indicating the electronic device 300 positioned within the pocket is obtained, from the processor 120. For example, the control circuitry 333 may identify whether obtaining the predetermined signal from the processor 120.

According to an embodiment, the control circuitry 333 may obtain the second data in response to the predetermined signal. For example, the control circuitry 333 may identify whether to transmit the first data to the processor 120, based on the second data.

According to an embodiment, the control circuitry 333 may use the second data for identifying whether to transmit the first data to the processor 120, in response to the predetermined signal obtained from the processor 120 while the second data is being obtained.

For example, the control circuitry 333 may, before the predetermined signal is obtained, refrain from obtaining the second data, or refrain from utilizing the second data for identifying whether to provide the first data to the processor 120.

For example, the predetermined signal may be provided to the control circuitry 333 from the processor 120, based on data obtained through the first sensor 310. For example, the processor 120 may obtain third data indicating a posture of the electronic device 300 through a first sensor 310 (e.g., a gyro sensor). For example, the processor 120 may obtain fourth data indicating a movement distance of the electronic device 300 through a first sensor 310 (e.g., an acceleration sensor). For example, the processor 120 may provide the predetermined signal to the control circuitry 333, based on the third data indicating the posture distinct from a predetermined posture and the fourth data indicating the movement distance greater than or equal to a reference distance.

For example, the predetermined posture may indicate a posture of the electronic device 300 when the user looks at the display 330. For example, the predetermined posture may indicate a posture of the electronic device 300 when the user causes a touch input contacted to the area. For example, the predetermined posture may refer, for example, to a posture in which the orientation of the electronic device 300 with respect to a gravitational acceleration direction is within a predetermined range. For example, the electronic device 300 with a posture distinct from the predetermined posture may indicate that the electronic device 300 is not being used by the user and is in a state of being included in a pocket (or bag). For example, the electronic device 300 with a posture distinct from the predetermined posture may indicate that the electronic device 300 is in a state incapable of receiving a touch input from the user.

For example, the reference distance may be used to identify whether the electronic device 300 is moved in a state in which it is carried by the user. For example, the electronic device moving more than the reference distance may indicate that the user is moving in a state in which the electronic device 300 is carried. For example, the electronic device 300 moving more than the reference distance with a posture distinct from the predetermined posture may indicate that the electronic device 300 is being moved within a pocket. For example, the electronic device 300 moving within a pocket may indicate that the electronic device 300 is in a state in which the probability of receiving the touch input on the area is relatively low. For example, the processor 120 may provide, to the control circuitry 333, the predetermined signal based on the third data indicating the posture distinct from the predetermined posture and the fourth data indicating the movement distance greater than or equal to the reference distance, through an estimation that the electronic device 300 is in the state.

According to an embodiment, the processor 120 may obtain fifth data indicating brightness around the electronic device 300 through a second sensor 320 (e.g., illuminance sensor). The processor 120 may provide, to the control circuitry 333, the predetermined signal based on the fifth data indicating the brightness less than reference brightness. For example, the brightness being less than the reference brightness may indicate that the electronic device 300 is positioned within a pocket.

According to an embodiment, the processor 120 may obtain sixth data indicating whether another external object is positioned within a predetermined distance from the electronic device 300 through a second sensor 320 (e.g., a proximity sensor). The processor 120 may provide, to the control circuitry 333, the predetermined signal based on the sixth data indicating that the other external object is positioned within the predetermined distance from the electronic device 300. For example, the other external object being positioned within the predetermined distance from the electronic device 300 may indicate that the electronic device 300 is positioned within a pocket.

According to an embodiment, the control circuitry 333 may identify whether the first data is associated with the reference partial area (e.g., the reference partial area 1160 of FIG. 11) within the area, based at least in part on the second data indicating the number less than the reference number. For example, the control circuitry 333 may provide, to the processor 120, the first data, which is obtained based on the node obtaining the peak value greater than or equal to the second threshold value and is associated with the reference partial area. For example, the control circuitry 333 may refrain from providing, to the processor 120, the first data, which is obtained based on the node obtaining the peak value less than the second threshold value and is associated with the reference partial area. For example, the control circuitry 333 may provide, to the processor 120, the first data, which is obtained based on the node obtaining the peak value greater than or equal to a fourth threshold value and is associated with another partial area within the area distinct from the reference partial area, wherein the fourth threshold value being less than or equal to the second threshold value. For example, the fourth threshold value may indicate a threshold value used for the other partial area before using the second data, obtaining the second data, and/or obtaining the predetermined signal. For example, the control circuitry 333 may refrain from providing, to the processor 120, the first data, which is obtained based on the node obtaining the peak value less than the fourth threshold value and is associated with the other partial area.

According to an embodiment, the control circuitry 333 may obtain a plurality of other values through each of the plurality of nodes within a second time interval after a first time interval during which the plurality of values are obtained, based at least in part on the external object at least partially contacted on the area. For example, a length of the first time interval and a length of a second time interval may be the same. For example, a length of each of the first time interval and the second time interval may correspond to a period of a touch vertical synchronization signal. For example, the control circuitry 333 may identify fourth nodes obtaining values greater than or equal to the second reference value among the plurality of nodes obtaining the plurality of other values. For example, the control circuitry 333 may identify fifth nodes obtaining values less than or equal to the third reference value among the plurality of nodes obtaining the plurality of other values. For example, the control circuitry 333 may obtain seventh data (e.g., the second data obtained within the second time interval) indicating the number of the fourth nodes and the fifth nodes. For example, the control circuitry 333 may be configured to provide, to the processor 120, the first data obtained based on the node obtaining the peak value greater than or equal to the first threshold value, based at least in part on the seventh data indicating the number that is greater than or equal to still another reference number (e.g., distinct from the reference number and the other reference number) less than the reference number. For example, the still another reference number may be used based on the identification that the number indicated by the second data within the first time interval is greater than or equal to the reference number (and/or the other reference number). For example, the still another reference number may be used based on the estimation that the electronic device 300 is positioned within a pocket. For example, the control circuitry 333 may refrain from providing, to the processor 120, the first data obtained based on the node obtaining the peak value less than the first threshold value, based at least in part on the seventh data indicating the number greater than or equal to the still another reference number. For example, the control circuitry 333 may provide, to the processor 120, the first data obtained based on the node obtaining the peak value greater than or equal to the second threshold value, based at least in part on the seventh data indicating the number less than the still another reference number. For example, the control circuitry 333 may refrain from providing, to the processor 120, the first data obtained based on the node obtaining the peak value less than the second threshold value, based at least in part on the seventh data indicating the number less than the still another reference number.

According to an embodiment, the control circuitry 333 may change a fourth reference value (e.g., the predetermined value) for identifying the peak value to a fifth reference value greater than the fourth reference value, based at least in part on the second data indicating the number greater than the reference number. For example, the control circuitry 333 may change the fourth reference value to the fifth reference value, in order to reduce obtaining the first data.

According to an embodiment, the control circuitry 333 may obtain the plurality of other values within the second time interval after the first time interval during which the plurality of values are obtained, through each of the plurality of nodes, based at least in part on the external object. For example, a difference between the fourth reference value (e.g., the predetermined value) and a sixth reference value predefined within the control circuitry 333 to identify a peak value among the plurality of other values may be reduced based at least in part on the second data indicating the number greater than or equal to the reference number. For example, the sixth reference value may be a value predefined within the control circuitry 333 to identify a touch input (e.g., a contact point following an initial contact point of a drag input) after an initial touch input (the initial contact point of the drag input) on the area. For example, the control circuitry 333 may increase the sixth reference value based at least in part on the second data.

According to an embodiment, the control circuitry 333 may identify a first value by adding values obtained through the node and the first nodes. For example, the control circuitry 333 may obtain the first data, based on the first value greater than or equal to a seventh reference value. For example, the control circuitry 333 may obtain the plurality of other values within the second time interval after the first time interval during which the plurality of values are obtained, through each of the plurality of nodes, based at least in part on the external object. For example, the control circuitry 333 may identify another node obtaining a peak value among the plurality of other values using the window, among the plurality of nodes. For example, the control circuitry 333 may identify fourth nodes around the other node, obtaining values greater than or equal to the first reference value, among the plurality of nodes. For example, the control circuitry 333 may identify a second value by adding values obtained through the other node and the fourth nodes. For example, the control circuitry 333 may obtain eighth data indicating another partial area that is at least partially different from the partial area, based on the second value greater than or equal to an eighth reference value, wherein the eighth reference value being smaller than the seventh reference value. A difference between the seventh reference value and the eighth reference value may be reduced based at least in part on the second data indicating the number greater than or equal to the reference number. For example, the eighth reference value may be a value predefined within the control circuitry 333 to identify a touch input (e.g., a contact point following an initial contact point of a drag input) following an initial touch input (the initial contact point of the drag input) on the area. For example, the control circuitry 333 may increase the eighth reference value based at least in part on the second data.

Figure 12:
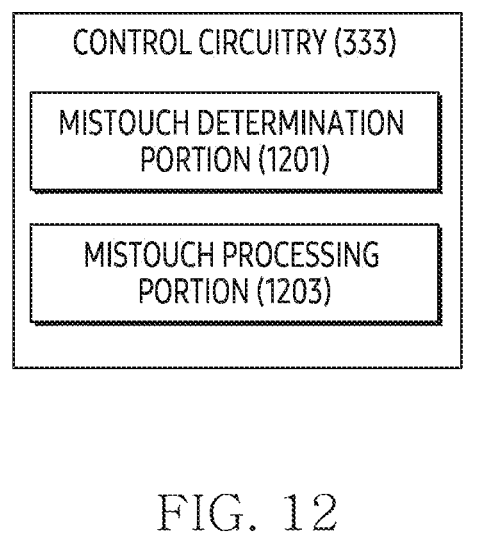

FIG. 12 is a block diagram illustrating example configurations in control circuitry according to various embodiments.

Referring to FIG. 12, control circuitry 333 may include a mistouch determination portion 1201 and a mistouch processing portion 1203, each of which may include various circuitry and/or executable program instructions.

For example, the mistouch determination portion 1201 may be used to identify whether the external object contacted on the area is the intended touch input or the unintended touch input. For example, the mistouch determination portion 1201 may be used to obtain the second data. For example, the mistouch determination portion 1201 may be used to identify whether the contact of the external object is the intended touch input or the unintended touch input, based at least in part on the second data.

For example, the mistouch processing portion 1203 may be configured to, based on the identification result of the mistouch determination portion 1201, provide the first data to the processor 120 or refrain from providing the first data to the processor 120.

FIG. 12 illustrates an example in which the mistouch determination portion 1201 and/or the mistouch processing portion 1203 are included in the control circuitry 333, but it is for convenience of explanation. For example, the mistouch determination portion 1201 and/or the mistouch processing portion 1203 may be included in the processor 120. However, the disclosure is not limited thereto.

As described above, the electronic device 300 may identify whether to recognize the external object at least partially contacted on the area capable of receiving a touch input as a touch input, using the touch circuitry 332. Through this identification, the electronic device 300 may reduce execution of a function unintended by the user within the electronic device 300.

Hereinafter, examples in which the operations illustrated above are combined are described. However, it should be noted that the combination of the operations is not limited to the examples below.

Figure 13:
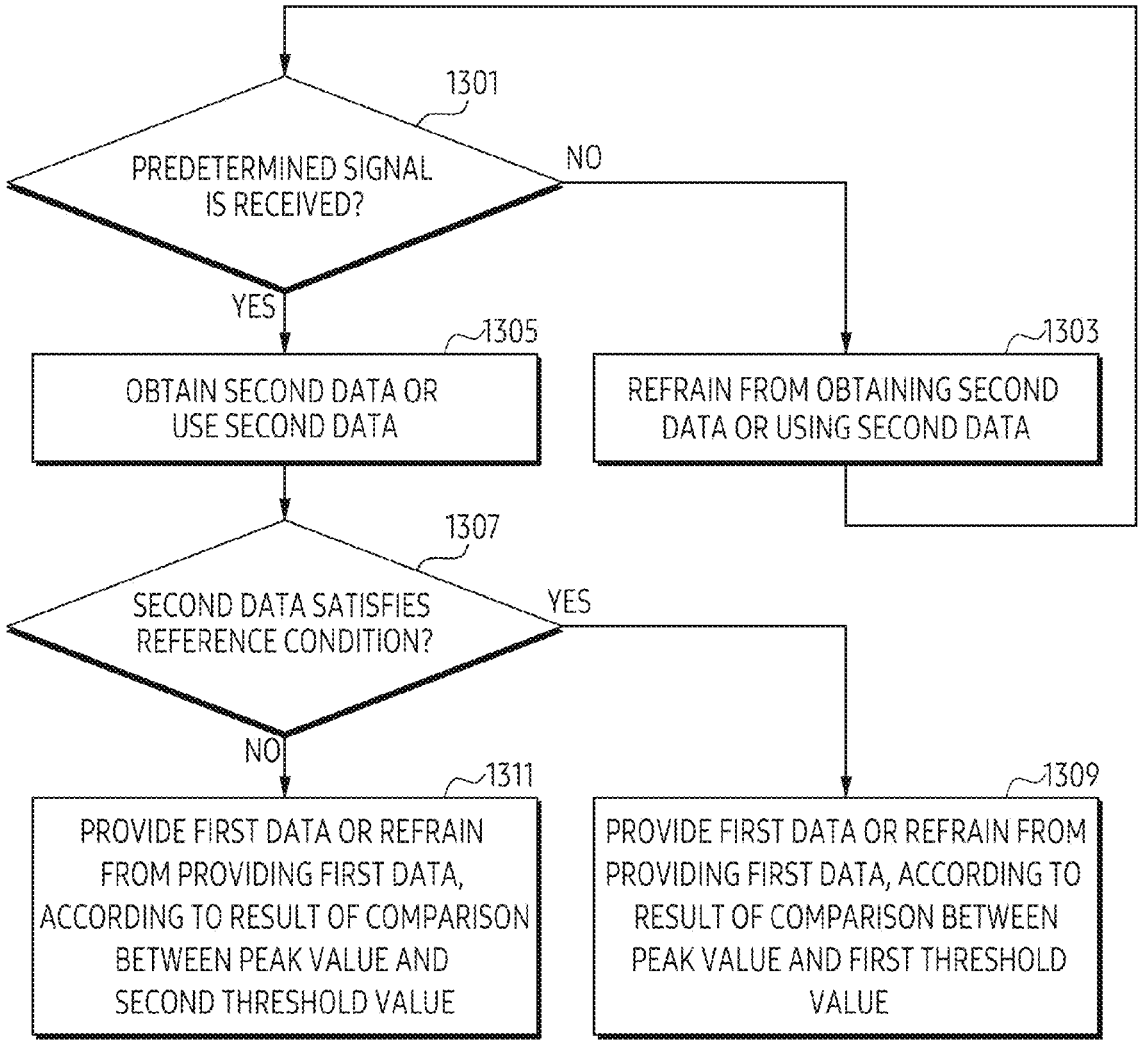
FIG. 13 is a flowchart illustrating an example operation of control circuitry according to various embodiments.

FIG. 13 is a flowchart illustrating an example operation of control circuitry according to various embodiments.

Referring to FIG. 13, in operation 1301, control circuitry 333 may identify whether the predetermined signal is received from the processor 120. For example, the predetermined signal may indicate a signal provided from the processor 120 to the control circuitry 333 based on the estimation that the electronic device 300 is positioned within a pocket. On a condition that the predetermined signal is received, the control circuitry 333 may execute operation 1305, and execute operation 1303 otherwise.

In operation 1303, the control circuitry 333 may refrain from obtaining or using the second data while the predetermined signal is not received. For example, since the predetermined signal being not received may indicate that the electronic device 300 is positioned outside a pocket, the control circuitry 333 may refrain from obtaining the second data in order to reduce the load. For example, since the predetermined signal being not received may indicate that the electronic device 300 is positioned outside a pocket, the control circuitry 333 may refrain from using the second data in order to enhance performance of recognizing the intended touch input. However, the disclosure is not limited thereto.

In operation 1305, the control circuitry 333 may obtain the second data or use the second data, in response to the predetermined signal being received. For example, since the contact of the external object on the area after the predetermined signal is received may be the unintended touch input, the control circuitry 333 may initiate obtaining the second data or initiate using the second data to identify whether the unintended touch input is received, in response to the predetermined signal.

In operation 1307, the control circuitry 333 may identify whether the second data satisfies a reference condition. For example, the fact that the second data satisfies the reference condition may indicate that the number indicated by the second data is greater than or equal to the reference number. For example, the fact that the second data does not satisfy the reference condition may indicate that the number is less than the reference number. However, the disclosure is not limited thereto. For example, the control circuitry 333 may execute operation 1311 based at least in part on the second data satisfying the reference condition, and otherwise execute operation 1309.

In operation 1309, on a condition that the second data satisfies the reference condition, the control circuitry 333 may provide the first data to the processor 120 or refrain from providing the first data to the processor 120, according to a result of comparison between the peak value and the first threshold value. For example, since the peak value being greater than or equal to the first threshold value may indicate that the contact of the external object is the intended touch input, the control circuitry 333 may provide, to the processor 120, the first data, for recognizing the intended touch input. For example, since the peak value being less than the first threshold value may indicate that the contact of the external object is the unintended touch input, the control circuitry 333 may refrain from providing, to the processor 120, the first data, in order to reduce providing a response according to the contact of the external object.

In operation 1311, on a condition that the second data does not satisfy the reference condition, the control circuitry 333 may provide the first data to the processor 120 or refrain from providing the first data to the processor 120, according to a result of comparison between the peak value and the second threshold value. For example, since the fact that the second data does not satisfy the reference condition may indicate that the electronic device 300 may be outside the pocket, the control circuitry 333 may compare the peak value with the second threshold value less than the first threshold value. For example, since the peak value being greater than or equal to the second threshold value may indicate that the contact of the external object is the intended touch input, the control circuitry 333 may provide, to the processor 120, the first data, for recognizing the intended touch input. For example, since the peak value being less than the second threshold value may indicate that the contact of the external object is the unintended touch input, the control circuitry 333 may refrain from providing the first data to the processor 120, in order to reduce providing a response according to the contact of the external object.

Figure 14:
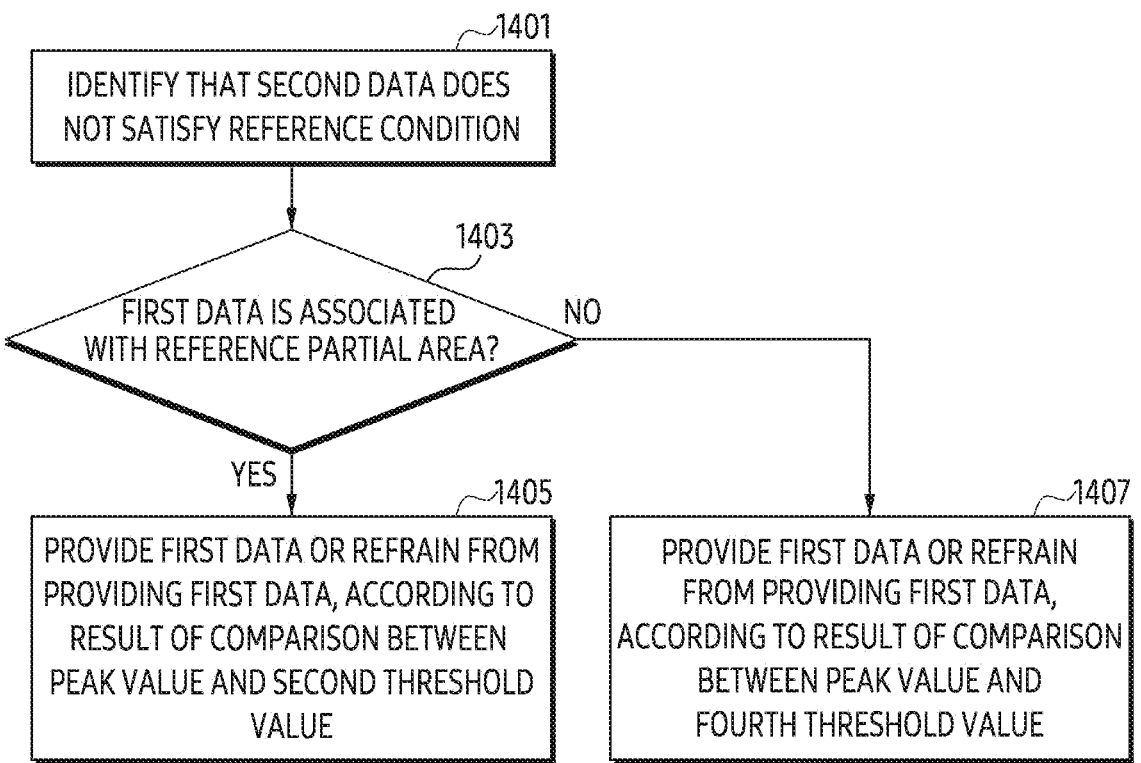
FIG. 14 is a flowchart illustrating an example operation of processing first data, based on a relationship between the first data and a reference partial area, according to various embodiments.

FIG. 14 is a flowchart illustrating an example operation of processing first data, based on a relationship between the first data and a reference partial area, according to various embodiments.

Operations 1401 to 1407 of FIG. 14 may be included in operations 1307 and 1309 of FIG. 13. However, the disclosure is not limited thereto.

Referring to FIG. 14, in operation 1401, the control circuitry 333 may identify that the second data does not satisfy the reference condition. In operation 1403, the control circuitry 333 may identify, in response to the identification, whether the first data is associated with the reference partial area. For example, since the reference partial area is an area providing a response (or feedback) for a touch input, the control circuitry 333 may identify whether the partial area indicated by the first data overlaps the reference partial area. For example, the control circuitry 333 may execute operation 1407 based on the first data associated with the reference partial area, and execute operation 1409 based on the first data that is not associated with the reference partial area.

In operation 1405, on a condition that the first data is associated with the reference partial area, the control circuitry 333 may provide the first data to the processor 120 or refrain from providing the first data to the processor 120, according to a result of comparison between the peak value and the second threshold value. For example, operation 1405 may correspond to operation 1309.

In operation 1407, on a condition that the first data is not associated with the reference partial area, the control circuitry 333 may provide the first data to the processor 120 or refrain from providing the first data to the processor 120, according to a result of comparison between the peak value and the fourth threshold value. For example, the fourth threshold value may be smaller than the second threshold value. For example, the fourth threshold value being smaller than the second threshold value may indicate that a possibility in which the contact of the external object is identified as the intended touch input is high. For example, the first data being associated with the reference partial area may indicate that the first data is associated with the other partial area within the area that is distinct from the reference partial area. For example, since the first data being associated with the other partial area may indicate that feedback for the first data is not executed even when the first data is provided to the processor 120, the control circuitry 333 may identify a threshold value for the other partial area as the fourth threshold value. For example, the control circuitry 333 may provide the first data to the processor 120, when the peak value is greater than or equal to the fourth threshold value. For example, the control circuitry 333 may refrain from providing the first data to the processor 120, when the peak value is less than the fourth threshold value.

Figure 15:
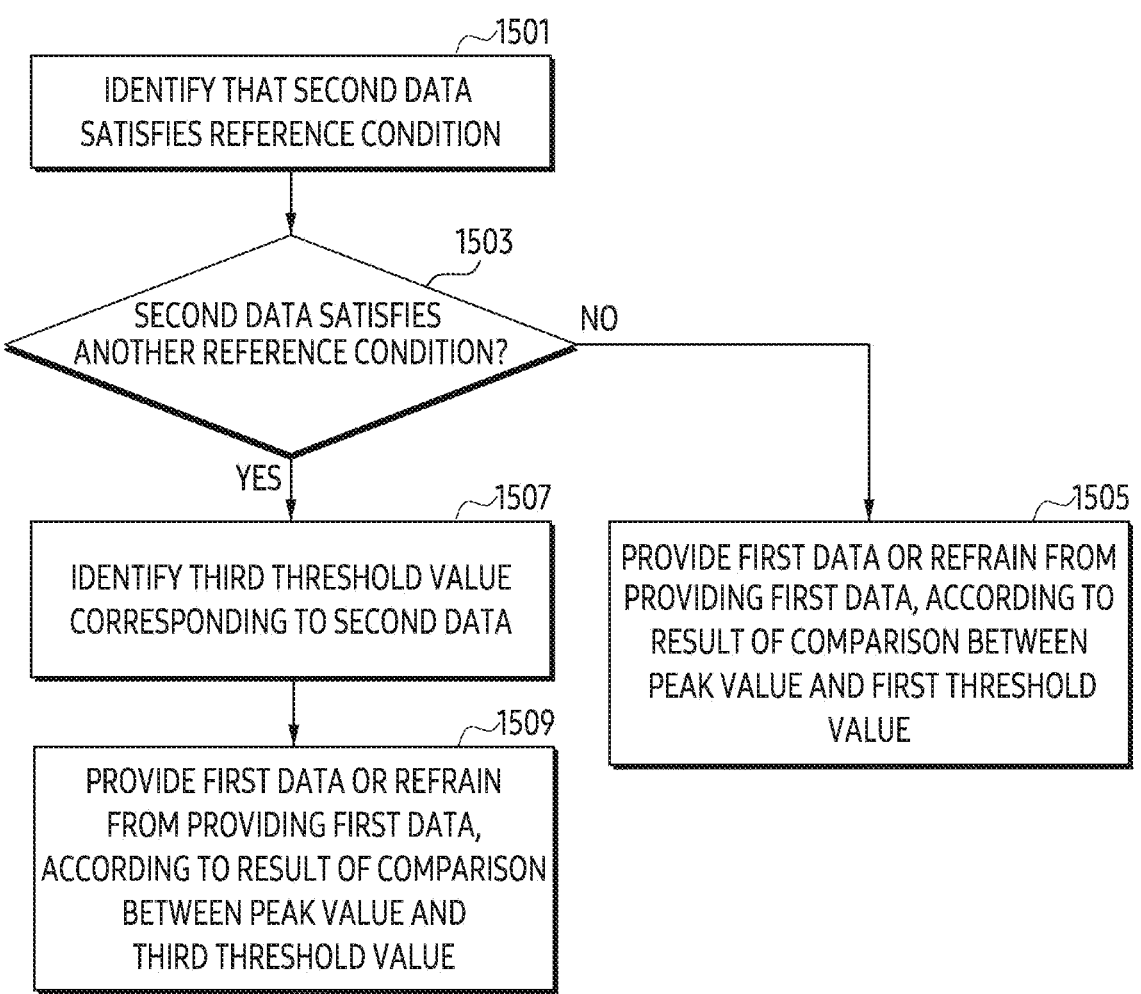
FIG. 15 is a flowchart illustrating an example operation of processing first data, based on whether second data satisfies another reference condition, according to various embodiments.

FIG. 15 is a flowchart illustrating an example operation of processing first data, based on whether second data satisfies another reference condition, according to various embodiments. Operations 1501 to 1509 of FIG. 15 may be included in operations 1307 and 1311 of FIG. 13. However, the disclosure is not limited thereto.

Referring to FIG. 15, in operation 1501, control circuitry 333 may identify that the second data satisfies the reference condition. In operation 1503, the control circuitry 333 may identify, in response to the identification, whether the second data satisfies another reference condition. For example, the fact that the second data satisfies the other reference condition may indicate that the number indicated by the second data is greater than or equal to the other reference number.

For example, the fact that the second data does not satisfy the other reference condition may indicate that the number is less than the other reference number. However, the disclosure is not limited thereto. For example, the control circuitry 333 may execute operation 1507 based at least in part on the second data satisfying the other reference condition, and otherwise execute operation 1505.

In operation 1505, on a condition that the second data does not satisfy the other reference condition, the control circuitry 333 may provide the first data to the processor 120 or refrain from providing the first data to the processor 120, according to a result of comparison between the peak value and the first threshold value. For example, operation 1505 may correspond to operation 1311.

In operation 1507, on a condition that the second data satisfies the other reference condition, the control circuitry 333 may identify the third threshold value corresponding to the second data. For example, the control circuitry 333 may identify the third threshold value, as indicated by the line 1075 in FIG. 10.

In operation 1509, in response to the identification, the control circuitry 333 may provide the first data to the processor 120 or refrain from providing the first data to the processor 120, according to a result of comparison between the peak value and the third threshold value. For example, the control circuitry 333 may provide the first data to the processor 120, based at least in part on the peak value greater than or equal to the third threshold value. For example, the control circuitry 333 may refrain from providing the first data to the processor 120, based at least in part on the peak value less than the third threshold value.

Figure 16:
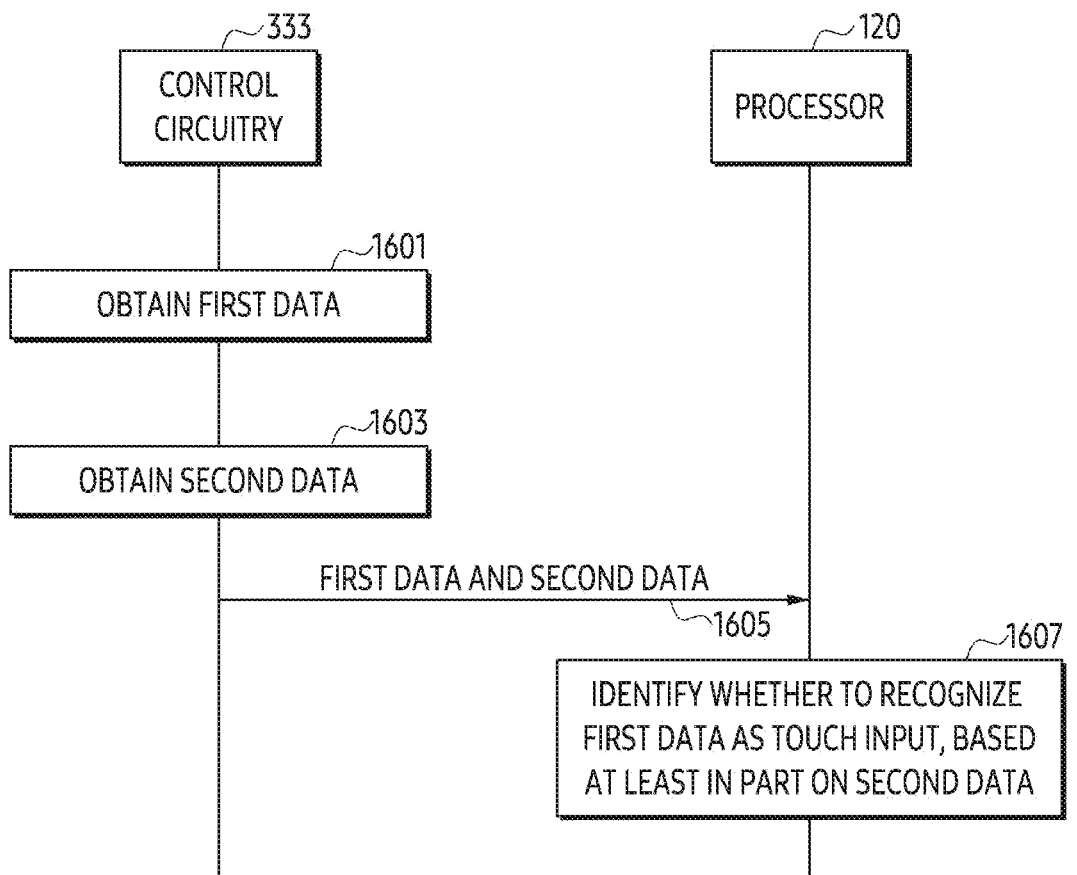
FIG. 16 is a signal flow diagram illustrating an example operation of a processor, according to various embodiments.

FIG. 16 is a signal flow diagram illustrating an example operation of a processor, according to various embodiments.

Referring to FIG. 16, in operation 1601, control circuitry 333 may obtain the first data based at least in part on the contact of the external object. For example, the first data may be obtained based on a period of the touch vertical synchronization signal.

In operation 1603, the control circuitry 333 may obtain the second data, based at least in part on the contact of the external object. For example, the second data may be obtained based on the period of the touch vertical synchronization signal. FIG. 16 illustrates an example in which operation 1603 is executed after operation 1601 is executed, but it is for convenience of explanation. For example, operation 1601 and operation 1603 may be executed in parallel. For example, operation 1601 may be executed after operation 1603 is executed.

In operation 1605, the control circuitry 333 may provide the first data and the second data to the processor 120. According to an embodiment, the control circuitry 333 may, in response to obtaining the first data and the second data, provide the first data and the second data to the processor 120, in order to enable the processor 120 to identify whether the contact of the external object is the unintended touch input or the intended touch input. The processor 120 may obtain the first data and the second data from the control circuitry 333.

In operation 1607, the processor 120 may, in response to obtaining the first data and the second data, identify whether to recognize the first data as a touch input based at least in part on the second data. For example, the processor 120 may identify whether the contact of the external object is the intended touch input or the unintended touch input, through execution of operation 1307, operation 1403, and/or operation 1503. For example, the processor 120 may obtain a response for the contact of the external object, based on identifying that the contact of the external object is the intended touch input. For example, the processor 120 may change a display state of the display 330, based on the response. For example, the processor 120 may cease, refrain from, or bypass providing the response, based on identifying that the contact of the external object is the unintended touch input. For example, the processor 120 may ignore the first data, based on identifying that the contact of the external object is the unintended touch input.

As described above, the electronic device 300 may reduce execution of operations unintended by the user within the electronic device 300, through obtaining and/or using of the second data.

As described above, an electronic device 300 may comprise a display panel 331 including an area 600 capable of receiving a touch input. According to an embodiment, the electronic device 300 may comprise touch circuitry 332 including control circuitry 333, and a touch sensor 334, the touch sensor 334 including a plurality of nodes in the area 600. According to an embodiment, the electronic device 300 may comprise a processor 120. According to an embodiment, the control circuitry 333 may be configured to, based at least in part on an external object at least partially contacted on the area 600, respectively obtain a plurality of values via each of the plurality of nodes. According to an embodiment, the control circuitry 333 may be configured to, based on the plurality of values, obtain first data indicating a partial area 720-1; 720-2 in the area 600 that includes a representative location of the contact of the external object. According to an embodiment, the control circuitry 333 may be configured to, based on the plurality of the values, obtain second data indicating at least a portion of the plurality of the nodes obtaining values within a reference range according to the contact of the external object. According to an embodiment, the control circuitry 333 may be configured to, based at least in part on the second data, provide, to the processor 120, the first data, for recognizing the contact of the external object as a touch input on the area 600, or refrain from providing, to the processor 120, the first data.

According to an embodiment, the control circuitry 333 may be configured to, using a window having a predetermined size, identify, from among the plurality of nodes, a node 700 obtaining a peak value from among the plurality of values. According to an embodiment, the control circuitry 333 may be configured to identify, from among the plurality of nodes, first nodes 701, being around the node 700, obtaining values that are equal to or greater than a first reference value. According to an embodiment, the control circuitry 333 may be configured to, based on the node 700 and the first nodes 701, obtain the first data. According to an embodiment, the control circuitry 333 may be configured to identify, from among the plurality of nodes, second nodes 910 obtaining values equal to or greater than a second reference value and third nodes 920 obtaining values equal to or less than a third reference value as the at least a portion of the plurality of nodes, the second reference value being less than the first reference value, the third reference value being less than the second reference value. According to an embodiment, the control circuitry 333 may be configured to, based on the second nodes 910 and the third nodes 920, obtain the second data.

According to an embodiment, each of the first reference value and the second reference value may be a positive number. According to an embodiment, the third reference value may be a negative number. According to an embodiment, an absolute value of the third reference value may be less than an absolute value of the first reference value.

According to an embodiment, the second data may indicate the number of the second nodes 910 and the third nodes 920.

According to an embodiment, the control circuitry 333 may be configured to, based at least in part on the second data indicating the number equal to or greater than a reference number, provide, to the processor 120, the first data obtained based on the node 700 obtaining the peak value equal to or greater than a first threshold value, and refrain from providing, to the processor 120, the first data obtained based on the node 700 obtaining the peak value less than the first threshold value. According to an embodiment, the control circuitry 333 may be configured to, based at least in part on the second data indicating the number less than the reference number, provide, to the processor 120, the first data obtained based on the node 700 obtaining the peak value equal to or greater than a second threshold value, the second threshold value being less than the first threshold value, and refrain from providing, to the processor 120, the first data obtained based on the node 700 obtaining the peak value less than the second threshold value.

According to an embodiment, the control circuitry 333 may be configured to, based at least in part on the second data indicating the number being equal to or greater than the reference number and being less than another reference number, the another reference number being greater than the reference number, provide, to the processor 120, the first data obtained based on the node 700 obtaining the peak value equal to or greater than the first threshold value, and refrain from providing, to the processor 120, the first data obtained based on the node 700 obtaining the peak value less than the first threshold value. According to an embodiment, the control circuitry 333 may be configured to, based at least in part on the second data indicating the number being equal to or great than the another reference number, identify a third threshold value corresponding to the number, provide, to the processor 120, the first data obtained based on the node 700 obtaining the peak value equal to or greater than the third threshold value, and refrain from providing, to the processor 120, the first data obtained based on the node 700 obtaining the peak value less than the third threshold value.

According to an embodiment, the control circuitry 333 may be configured to identify whether obtaining, from the processor 120, a predetermined signal indicating the electronic device 300 positioned in a pocket. According to an embodiment, the control circuitry 333 may be configured to, in response to the predetermined signal, obtain the second data. According to an embodiment, the control circuitry 333 may be configured to, before the predetermined signal is obtained, refrain from obtaining the second data, or refrain from utilizing the second data for identifying whether providing the first data to the processor 120.

According to an embodiment, the electronic device 300 may further comprise an inertial sensor 310. According to an embodiment, the processor 120 may be configured to obtain, via the at least one inertial sensor 310, third data indicating a posture of the electronic device 300 and fourth data indicating a movement distance of the electronic device 300. According to an embodiment, the processor 120 may be configured to, based on the third data indicating the posture of the electronic device 300 different from a predetermined posture and the fourth data indicating the movement distance of the electronic device 300 equal to or greater than a reference distance, provide, to the control circuitry 333, the predetermined signal.

According to an embodiment, the control circuitry 333 may be configured to, based at least in part on the second data indicating the number less than the reference number, identify whether the first data is associated with a reference partial area 1160 in the area. According to an embodiment, the control circuitry 333 may be configured to provide, to the processor 120, the first data, obtained based on the node 700 obtaining the peak value equal to or greater than the second threshold value, associated with the reference partial area 1160. According to an embodiment, the control circuitry 333 may be configured to refrain from providing, to the processor 120, the first data, obtained based on the node 700 obtaining the peak value less than the second threshold value, associated with the reference partial area 1160. According to an embodiment, the control circuitry 333 may be configured to provide, to the processor 120, the first data, associated with another partial area different from the reference partial area 1160, obtained based on the node 700 obtaining the peak value equal to or greater than a fourth threshold value, the fourth threshold value being less than the second threshold value. According to an embodiment, the control circuitry 333 may be configured to refrain from providing, to the processor 120, the first data, associate with the other partial area, obtained based on the node 700 obtaining the peak value less than the fourth threshold value.

According to an embodiment, the reference partial area 1160 may be a portion of the area executing a predetermined function in response to a touch input.

According to an embodiment, the electronic device 300 may further comprise an illuminance sensor 320. According to an embodiment, the processor 120 may be configured to obtain fifth data indicating a brightness around the electronic device, via the illuminance sensor 320. According to an embodiment, the processor 120 may be configured to, further based on the fifth data indicating the brightness less than a reference brightness, provide, to the control circuitry 333, the predetermined signal.

According to an embodiment, the electronic device 300 may further comprise a proximity sensor 320. According to an embodiment, the processor 120 may be configured to obtain fifth data indicating whether another external object is positioned within a predetermined distance from the electronic device 300, via the proximity sensor 320. According to an embodiment, the processor 120 may be configured to, further based on the fifth data indicating that the other external object is positioned within the predetermined distance from the electronic device 300, provide, to the control circuitry 333, the predetermined signal.

According to an embodiment, the control circuitry 333 may be configured to, based at least in part on the external object, obtain a plurality of other values via each of the plurality of nodes in a second time interval after a first time interval, the first time interval obtaining the plurality of values. According to an embodiment, the control circuitry 333 may be configured to identify, from among the plurality of nodes obtaining the plurality of other values, fourth nodes obtaining values equal to or greater than the second reference value and fifth nodes obtaining values equal to or less than the third reference value. According to an embodiment, the control circuitry 333 may be configured to obtain third data indicating a number of the fourth nodes and the fifth nodes. According to an embodiment, the control circuitry 333 may be configured to, based at least in part on the third data indicating the number equal to or greater than another reference number, provide, to the processor 120, the first data obtained based on the node obtaining the peak value equal to or greater than the first threshold value, the another reference number being smaller than the reference number, and refrain from providing, to the processor 120, the first data obtained based on the node obtaining the peak value less than the first threshold value. According to an embodiment, the control circuitry 333 may be configured to, based at least in part on the third data indicating the number less than the another reference number, provide, to the processor 120, the first data obtained based on the node obtaining the peak value equal to or greater than the second threshold value, and refrain from providing, to the processor 120, the first data obtained based on the node obtaining the peak value less than the second threshold value.

According to an embodiment, the control circuitry 333 may be configured to, based at least in part on the second data indicating the number equal to or greater than a reference number, change a fourth reference value for identifying the peak value to a fifth reference value greater than the fourth reference value.

According to an embodiment, the control circuitry 333 may be configured to, based at least in part on the external object, obtain a plurality of other values within a second time interval after a first time interval during which the plurality of values are obtained, through each of the plurality of nodes. A difference between a fourth reference value used for identifying the peak value among the plurality of values and a fifth reference value used for identifying the peak value among the plurality of other values may be reduced, based at least in part on the second data indicating the number greater than or equal to a reference number.

According to an embodiment, the control circuitry 333 may be configured to identify a first value by adding values obtained through the node and the first nodes. According to an embodiment, the control circuitry 333 may be configured to obtain the first data, based on the first value greater than or equal to a fourth reference value. According to an embodiment, the control circuitry 333 may be configured to, based at least in part on the external object, obtain a plurality of other values, within a second time interval after a first time interval during which the plurality of values are obtained, through each of the plurality of nodes. According to an embodiment, the control circuitry 333 may be configured to identify, among the plurality of nodes, another node obtaining a peak value from among the plurality of other values, by using the window. According to an embodiment, the control circuitry 333 may be configured to identify fourth nodes around the other node, which obtain values greater than or equal to the first reference value, among the plurality of nodes. According to an embodiment, the control circuitry 333 may be configured to identify a second value, by adding values obtained through the other node and the fourth nodes. According to an embodiment, the control circuitry 333 may be configured to obtain third data indicating a partial area at least partially different from the partial area, based on the second value greater than or equal to a fifth reference value, the fifth reference value being less than the fourth reference value. According to an embodiment, a difference between the fourth reference value and the fifth reference value may be reduced based at least in part on the second data indicating the number greater than or equal to a reference number.

According to an embodiment, the processor 120 may be configured to identify a response for the contact of the external object, based on the first data. According to an embodiment, the processor 120 may be configured to change a display within the area, based at least in part on the response.

As described above, an electronic device 300 may comprise a display panel 331 including an area 600 capable of receiving a touch input. According to an embodiment, the electronic device 300 may comprise touch circuitry 332 including control circuitry 333, and a touch sensor 334, the touch sensor 334 including a plurality of nodes in the area 600. According to an embodiment, the electronic device 300 may comprise a processor 120. According to an embodiment, the control circuitry 333 may be configured to, based at least in part on an external object at least partially contacted on the area 600, respectively obtain a plurality of values via each of the plurality of nodes. According to an embodiment, the control circuitry 333 may be configured to, based on the plurality of values, obtain first data indicating a partial area 720-1; 720-2 in the area 600 that includes a representative location of the contact of the external object. According to an embodiment, the control circuitry 333 may be configured to, based on the plurality of the values, obtain second data indicating at least a portion of the plurality of the nodes obtaining values within a reference range according to the contact of the external object. According to an embodiment, the control circuitry 333 may be configured to, provide, to the processor 120, the first data and the second data. According to an embodiment, the processor 120 may be configured to, based at least in part on the second data, identify whether recognizing the first data as a touch input on the area.

According to an embodiment, the control circuitry 333 may be configured to, using a window having a predetermined size, identify, from among the plurality of nodes, a node obtaining a peak value from among the plurality of values. According to an embodiment, the control circuitry 333 may be configured to identify, from among the plurality of nodes, first nodes, being around the node, obtaining values that are equal to or greater than a first reference value. According to an embodiment, the control circuitry 333 may be configured to, based on the node and the first nodes, obtain the first data. According to an embodiment, the control circuitry 333 may be configured to identify, from among the plurality of nodes, second nodes obtaining values equal to or greater than a second reference value, the second reference value less than the first reference value. According to an embodiment, the control circuitry 333 may be configured to identify, from among the plurality of nodes, third nodes obtaining values equal to or less than a third reference value, the third reference value less than the second reference value. According to an embodiment, the control circuitry 333 may be configured to, based on the second nodes and the third nodes, obtain the second data.

According to an example embodiment, each of the first reference value and the second reference value may be a positive number. According to an example embodiment, the third reference value may be a negative number. According to an example embodiment, an absolute value of the third reference value may be less than an absolute value of the first reference value.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a display panel including a touch-sensitive area;
touch circuitry including control circuitry, and a touch sensor, the touch sensor including a plurality of nodes in the touch-sensitive area; and
at least one processor comprising processing circuitry,
wherein the control circuitry is configured to:
based at least in part on an external object at least partially contacting the area, respectively obtain values via the nodes, wherein the values include a peak value;
based on the values, obtain first data indicating a partial area of the touch-sensitive area including a representative location of the contact of the external object;
based on the values, obtain second data indicating at least a portion of the nodes obtaining values within a reference range according to the contact of the external object;
based on the second data satisfying a reference condition, in accordance with the peak value being larger than a first threshold value, provide, to the at least one processor, the first data, for recognizing the contact of the external object as a touch input on the touch-sensitive area; and
based on the second data not satisfying the reference condition, in accordance with the peak value being larger than a second threshold value smaller than the first threshold value, provide, to the at least one processor, the first data, for recognizing the contact of the external object as a touch input on the touch-sensitive area.

2. The electronic device of claim 1, wherein the control circuitry is configured to:
using a window having a defined size, identify, from among the nodes, a node obtaining the peak value;

identify, from among the nodes, first nodes, being around the node, obtaining values that are greater than a first reference value;
based on the node and the first nodes, obtain the first data;
identify, from among the nodes, second nodes obtaining values greater than a second reference value and third nodes obtaining values less than a third reference value as at least the portion of the nodes, the second reference value less than the first reference value, wherein the third reference value is less than the second reference value; and
based on the second nodes and the third nodes, obtain the second data.

3. The electronic device of claim 2, wherein each of the first reference value and the second reference value is a positive number,
wherein the third reference value is a negative number, and
wherein an absolute value of the third reference value is less than an absolute value of the first reference value.

4. The electronic device of claim 2, wherein the second data indicates a number of at least the portion of the nodes including the second nodes and the third nodes.

5. The electronic device of claim 4, wherein the control circuitry is configured to:
based on the number of at least the portion of the nodes being identified through the second data as greater than a reference number, identifying the second data satisfying the reference condition;
based on the number of at least the portion of the nodes being identified through the second data as less than the reference number, identifying the second data not satisfying the reference condition;
based on the second data being identified as satisfying the reference condition and the peak value being identified as larger than the first threshold value, provide, to the at least one processor, the first data;
based on the second data being identified as satisfying the reference condition and the peak value being identified as smaller than the first threshold value,
refrain from providing, to the at least one processor, the first data;
based on the second data being identified as not satisfying the reference condition and the peak value being identified as larger than the second threshold value,
provide, to the at least one processor, the first data; and
based on the second data being identified as not satisfying the reference condition and the peak value being identified as smaller than the second threshold value, refrain from providing, to the at least one processor, the first data.

6. The electronic device of claim 5, wherein the control circuitry is configured to:
based on the number of at least the portion of the nodes being identified through the second data as being greater than the reference number and being less than another reference number, in accordance with the peak value being larger than the first threshold value,
provide, to the at least one processor, the first data, the another reference number being greater than the reference number;
based on the number of at least the portion of the nodes being identified through the second data as being less than the reference number, in accordance with the peak value being larger than the second threshold value, provide, to the at least one processor, the first data; and based on the number of at least the portion of the nodes being identified through the second data as great than the another reference number:

identify a third threshold value corresponding to the number of at least the portion of the nodes, and in accordance with the peak value being larger than the third threshold value, provide, to the at least one processor, the first data.

7. The electronic device of claim 5, wherein the control circuitry is configured to:

identify whether obtaining, from the at least one processor, a defined signal indicating the electronic device positioned in a pocket;

in response to the defined signal, obtain the second data; and before the defined signal is obtained:

refrain from obtaining the second data, or refrain from utilizing the second data for determining whether providing the first data to the at least one processor.

8. The electronic device of claim 7, further comprising:

an inertial sensor, and memory comprising one or more storage media storing instructions, wherein the instructions, when executed by the at least one processor individually and/or collectively, cause the electronic device to:

obtain, via the inertial sensor, third data and fourth data; and based on a posture of the electronic device being identified through the third data as different from a defined posture and a movement distance of the electronic device being identified through the fourth data as greater than a distance threshold, provide, to the control circuitry, the defined signal.

9. The electronic device of claim 7, wherein the control circuitry is configured to:

based on the number of at least the portion of the nodes being identified as less than the reference number, identify whether the first data is associated with a reference partial area of the touch-sensitive area;

based on the first data being associated with the reference partial area and the peak value being larger than the second threshold value, provide, to the at least one processor, the first data;

based on the first data being associated with the reference partial area and the peak value being smaller than the second threshold value, refrain from providing, to the at least one processor, the first data;

based on the first data being associated with another partial area of the touch sensitive area different from the reference partial area and the peak value being larger than a fourth threshold value, provide, to the at least one processor, the first data, the fourth threshold value less than the second threshold value; and based on the first data being associated with the another partial area and the peak value being smaller than the fourth threshold value, refrain from providing, to the at least one processor, the first data.

10. The electronic device of claim 9, wherein the reference partial area is a portion of the area executing a defined function in response to a touch input.

11. The electronic device of claim 7, further comprising:

an illuminance sensor, and memory comprising one or more storage media storing instructions, wherein the instructions, when executed by the at least one processor individually and/or collectively, cause the electronic device to:

obtain fifth data, via the illuminance sensor, and based on an ambient brightness being identified through the fifth data as less than an ambient brightness threshold, provide, to the control circuitry, the defined signal.

12. The electronic device of claim 7, further comprising:

a proximity sensor, and memory comprising one or more storage media storing instructions, wherein the instructions, when executed by the at least one processor individually and/or collectively, cause the electronic device to:

obtain fifth data, via the proximity sensor; and based on another external object being identified through the fifth data as positioned within a defined distance from the electronic device, provide, to the control circuitry, the defined signal.

13. The electronic device of claim 5, wherein the control circuitry is further configured to:

based at least in part on the external object, respectively obtain other values via the nodes in a second time interval after a first time interval, the first time interval obtaining the values;

identify, from among the nodes respectively obtaining the other values, fourth nodes obtaining values greater than the second reference value and fifth nodes obtaining values less than the third reference value;

based at least in part on the number of the fourth nodes and the fifth nodes being greater than another reference number:

in accordance with the peak value being larger than the first threshold value, provide, to the at least one processor, the first data, the another reference number smaller than the reference number, and in accordance with the peak value being smaller than the first threshold value, refrain from providing, to the at least one processor, the first data; and based at least in part on the number of the fourth nodes and the fifth nodes being less than the another reference number:

in accordance with the peak value being larger than the second threshold value, provide, to the at least one processor, the first data, and in accordance with the peak value being smaller than the second threshold value, refrain from providing, to the at least one processor, the first data.

14. The electronic device of claim 4, wherein the control circuitry is further configured to:

based at least in part on the number of at least the portion of the nodes being greater than a reference number, change a fourth reference value for identifying the peak value to a fifth reference value greater than the fourth reference value.

15. The electronic device of claim 4, wherein the control circuitry is further configured to:

based at least in part on the external object, respectively obtain, through the nodes, other values, in a second time interval subsequent to a first time interval obtaining the values, and wherein a difference between a fourth reference value used for identifying the peak value from among the values and a fifth reference value used for identifying a peak value from among the other values is reduced based on the number of at least the portion of the nodes being greater than a reference number.

16. The electronic device of claim 4, wherein the control circuitry is configured to:

identify a first value by adding values obtained through the node and the first nodes; and based on the first value greater than a fourth reference value, obtain the first data, wherein the control circuitry is further configured to:

based at least in part on the external object, respectively obtain, through the nodes, in a second time interval subsequent to a first time interval obtaining the values, other values;

using the window, identify, from among the nodes, another node obtaining a peak value from among the other values;

identify, in the second time interval, fourth nodes around the other node that obtain values greater than the first reference value, from among the nodes;

identify a second value by adding values obtained through the other node and the fourth nodes; and based on the second value being greater than a fifth reference value that is less than the fourth reference value, obtain third data indicating a partial area of the touch-sensitive area, and wherein a difference between the fourth reference value and the fifth reference value is reduced based at least in part on the second data indicating the number of at least the portion of the nodes as greater than a reference number.

17. The electronic device of claim 1, comprising:

memory comprising one or more storage media storing instructions, wherein the instructions, when executed by the at least one processor individually and/or collectively, cause the electronic device to:

based on the first data, identify a response regarding the contact of the external object; and based at least in part on the response, change a display state of the touch-sensitive area.

18. An electronic device comprising:

a display panel including a touch-sensitive area;

touch circuitry including control circuitry, and a touch sensor, the touch sensor including a plurality of nodes in the touch-sensitive area;

memory comprising one or more storage media storing instructions; and at least one processor comprising processing circuitry, wherein the control circuitry (333) is configured to:

based at least in part on an external object at least partially contacting the area, respectively obtain values via the nodes, wherein the values include a peak value;

based on the values, obtain first data indicating a partial area of the touch-sensitive area including a representative location of the contact of the external object;

based on the values, obtain second data indicating at least a portion of the nodes obtaining values within a reference range according to the contact of the external object; and provide, to the at least one processor, the first data and the second data, and wherein the instructions, when executed by the at least one processor individually and/or collectively, cause the electronic device to:

based on the second data satisfying a reference condition, compare the peak value with a first threshold value, for determining whether to recognize the first data as a touch input on the area;

based on the second data not satisfying the reference condition, compare the peak value with a second threshold value smaller than the first threshold value, for determining whether recognize the first data as a touch input on the area.

19. The electronic device of claim 18, wherein the control circuitry is configured to:

using a window having a defined size, identify, from among the plurality of nodes, a node obtaining the peak value;

identify, from among the nodes, first nodes, being around the node, obtaining values that are greater than a first reference value;

based on the node and the first nodes, obtain the first data;

identify, from among the nodes, second nodes obtaining values greater than a second reference value, the second reference value less than the first reference value;

identify, from among the nodes, third nodes obtaining values less than a third reference value, the third reference value less than the second reference value; and based on the second nodes and the third nodes, obtain the second data.

20. The electronic device of claim 18, wherein the instructions, when executed by the at least one processor individually and/or collectively, cause the electronic device to:

based on the second data satisfying the reference condition, in accordance with the peak value being larger than the first threshold value, recognize, using the first data, the contact of the external object as a touch input on the touch-sensitive area; and based on the second data not satisfying the reference condition, in accordance with the peak value being larger than the second threshold value, recognize, using the first data, the contact of the external object as a touch input on the touch-sensitive area.

* * * * *